(12) United States Patent
Kassa

(10) Patent No.: US 10,089,411 B2
(45) Date of Patent: Oct. 2, 2018

(54) METHOD AND APPARATUS AND COMPUTER READABLE MEDIUM FOR COMPUTING STRING SIMILARITY METRIC

(71) Applicant: NEUSTAR, INC., McLean, VA (US)

(72) Inventor: Debish Fesehaye Kassa, Champaign, IL (US)

(73) Assignee: NEUSTAR INC., McLean, VA (US)

(*) Notice: Subject to any disclaimer, the term of this patent is extended or adjusted under 35 U.S.C. 154(b) by 435 days.

(21) Appl. No.: 14/494,761

(22) Filed: Sep. 24, 2014

(65) Prior Publication Data

US 2015/0186502 A1    Jul. 2, 2015

Related U.S. Application Data

(60) Provisional application No. 61/923,097, filed on Jan. 2, 2014.

(51) Int. Cl.
*G06F 17/30* (2006.01)

(52) U.S. Cl.
CPC ............................ *G06F 17/30985* (2013.01)

(58) Field of Classification Search
CPC ................. G06F 17/30985; G06F 2207/025
See application file for complete search history.

(56) References Cited

U.S. PATENT DOCUMENTS 4,490,811 A * 12/1984 Yianilos ............ G06F 17/30985
2010/0114879 A1 * 5/2010 Zhong .................. G06F 17/278
707/723

2012/0140979 A1 * 6/2012 Nishiwaki ................ B07C 3/14
382/101
2012/0269438 A1 * 10/2012 Kutsumi ............... G06K 9/3283
382/182
2012/0327003 A1 * 12/2012 Matsumura ......... G06F 3/04883
345/173

(Continued)

OTHER PUBLICATIONS

Jones, Neil C.; Pevzner, Pavel, Aug. 6, 2004, An Introduction to Bioinformatics Algorithms, The MIT Press, 1 edition, ISBN-13: 978-0262101066.*

(Continued)

*Primary Examiner* — Azam Cheema
*Assistant Examiner* — Faezeh Forouharnejad
(74) *Attorney, Agent, or Firm* — Mahamedi IP Law LLP

(57) ABSTRACT

A string similarity apparatus, method, and computer readable medium which manages caching of resources. The method includes storing a plurality of software instructions, executing the plurality of software instructions, such as, determining a first number of characters contained by a first string, determining a second number of characters contained by a second string, determining a larger number from among the first number and the second number, setting the larger number to a string length value, determining a maximum number of subsequent characters from the first strings which match subsequent characters from the second string and setting the value, setting the maximum number to a maximum group size value, calculating a resulting value by subtracting the maximum group size value from the string length value, and outputting the resulting value which represents a computational cost of converting the first string into the second string.

14 Claims, 24 Drawing Sheets

(56) References Cited

U.S. PATENT DOCUMENTS

| | | | | |
|---|---|---|---|---|
| 2013/0191469 A1* | 7/2013 | Dichiu | ............... | H04L 63/0263 709/206 |
| 2013/0325884 A1* | 12/2013 | Soel | ................... | G06F 17/2211 707/758 |
| 2014/0067728 A1* | 3/2014 | Ogren | .............. | G06F 17/30569 706/12 |
| 2014/0298460 A1* | 10/2014 | Xue | ................... | H04L 63/1425 726/23 |
| 2016/0048584 A1* | 2/2016 | Valentin | ........... | G06F 17/30637 707/770 |

OTHER PUBLICATIONS

Mariano Consens; Gonzalo Navarro, String Processing and Information Retrieval12th International Conference, SPIRE 2005,Buenos Aires, Argentina, Nov. 2-4, 2005Proceedings, ISBN-10 3-540-29740-5 Springer Berlin Heidelberg NewYork.*

Robert A Wagner;Michael J Fischer, String-to-string correction problem, 1974, Journal of the ACM.*

* cited by examiner

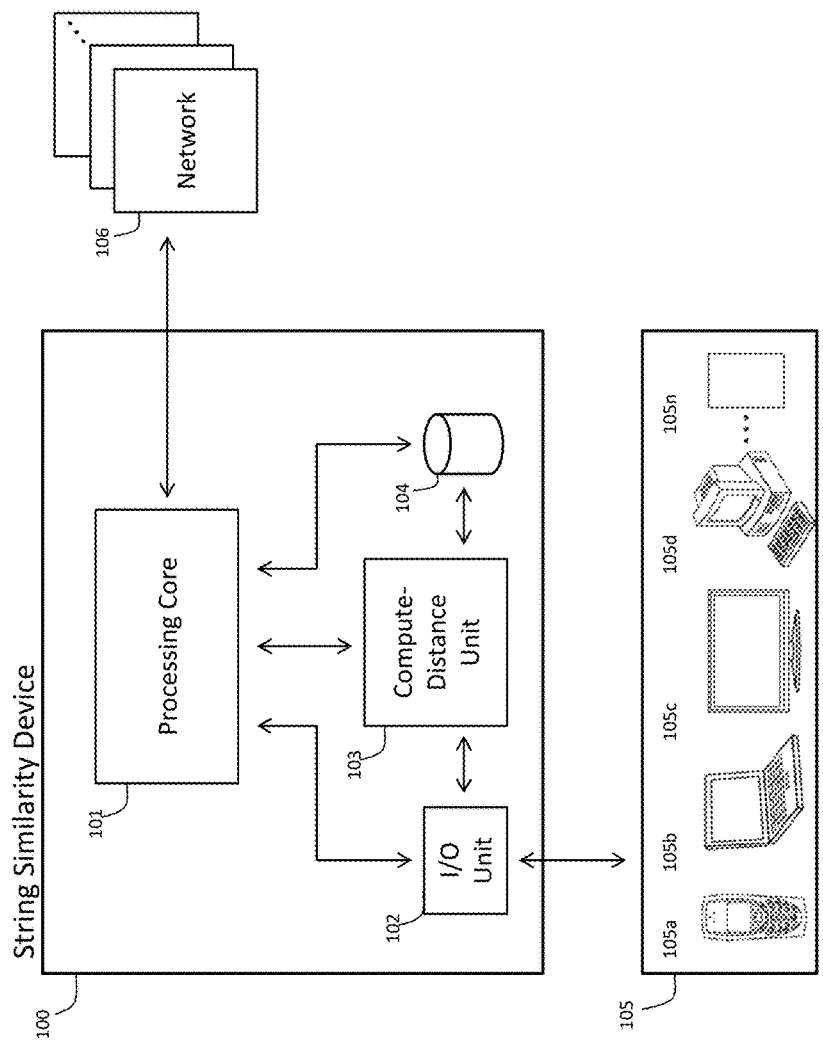

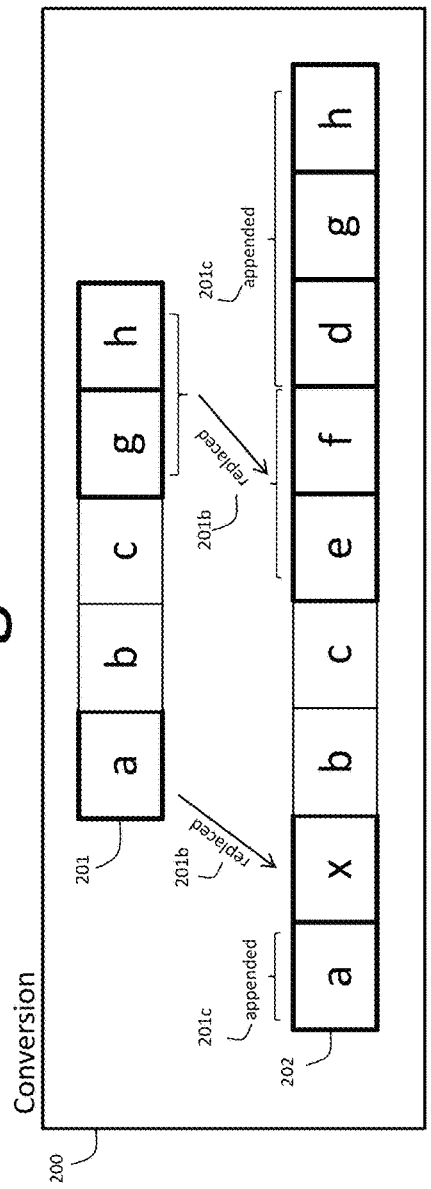

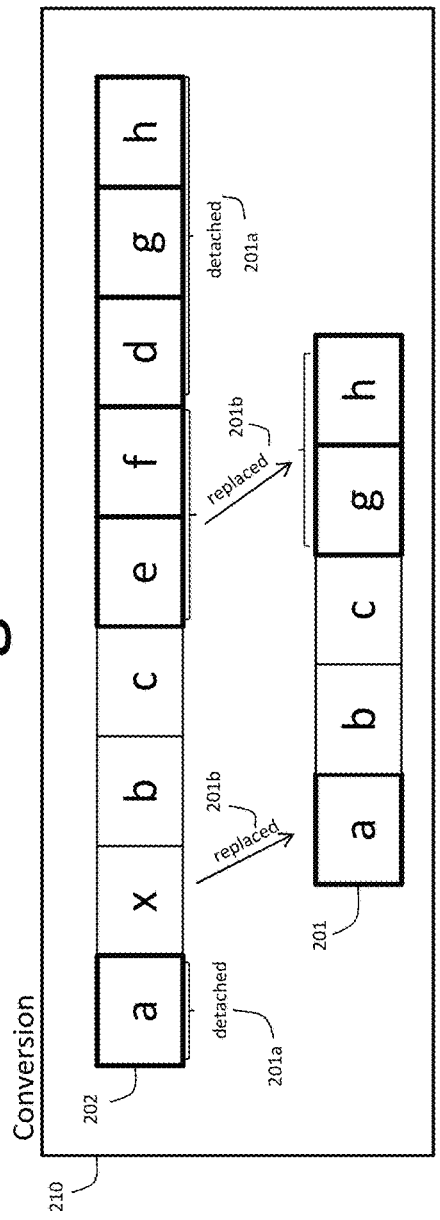

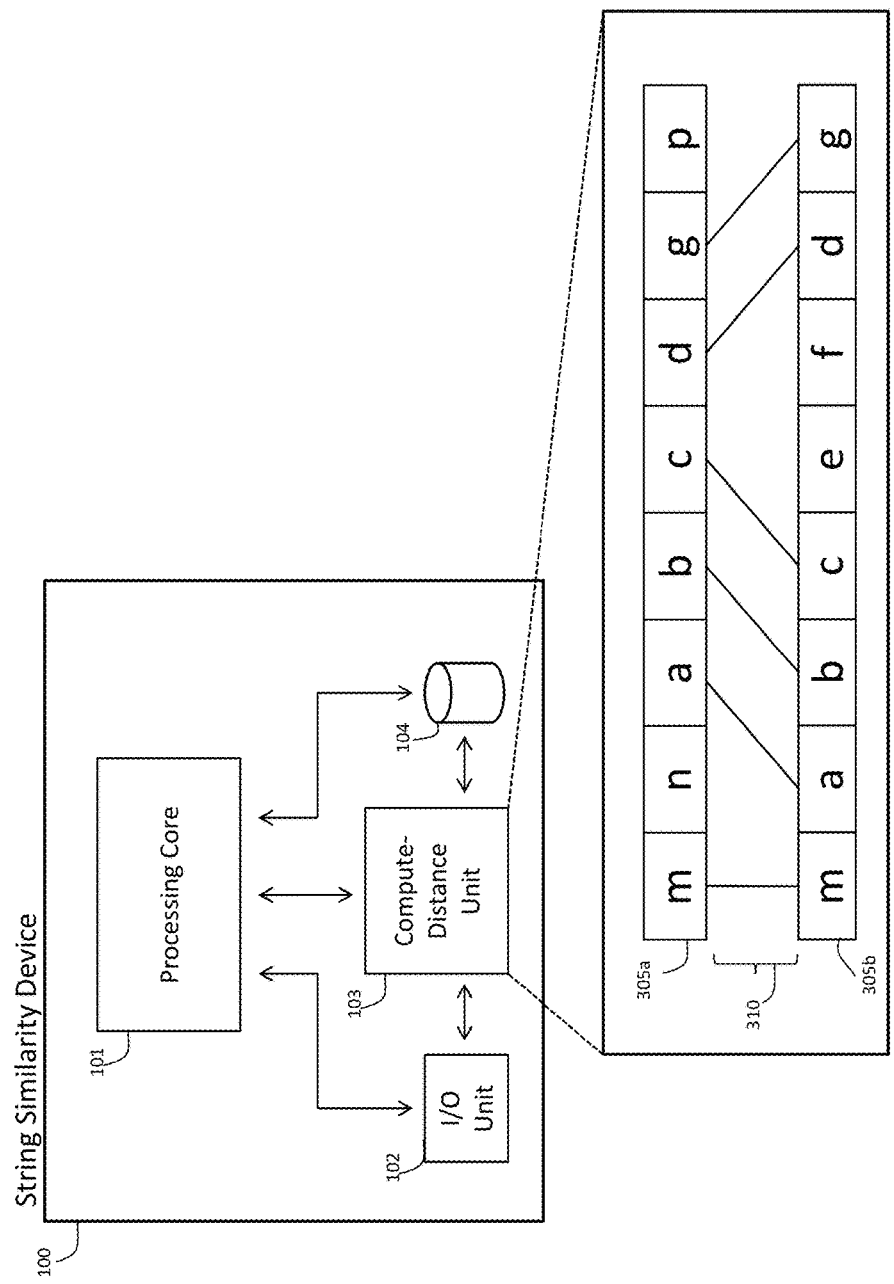

Fig. 4

Compute Distance Pseudocode

600

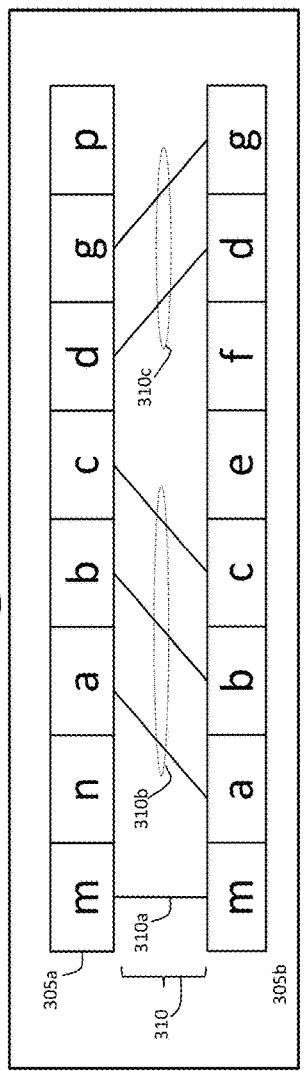

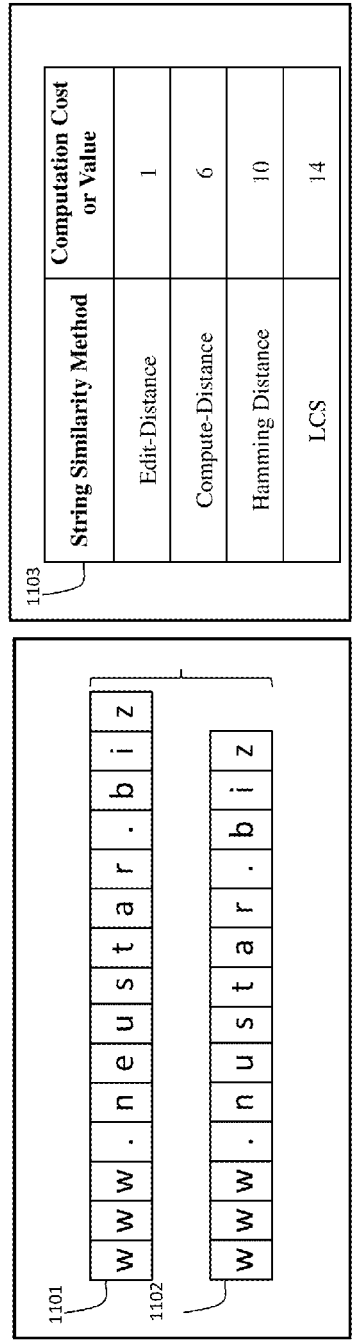
Fig. 11a
Fig. 11b
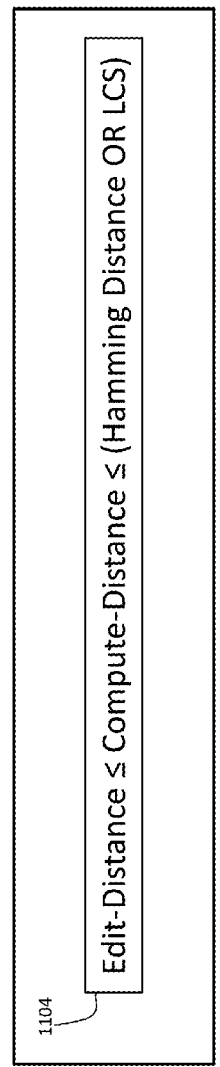
Fig. 11c

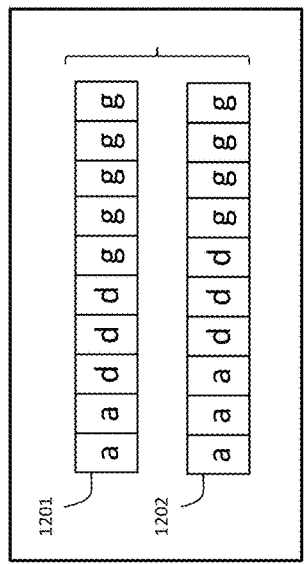

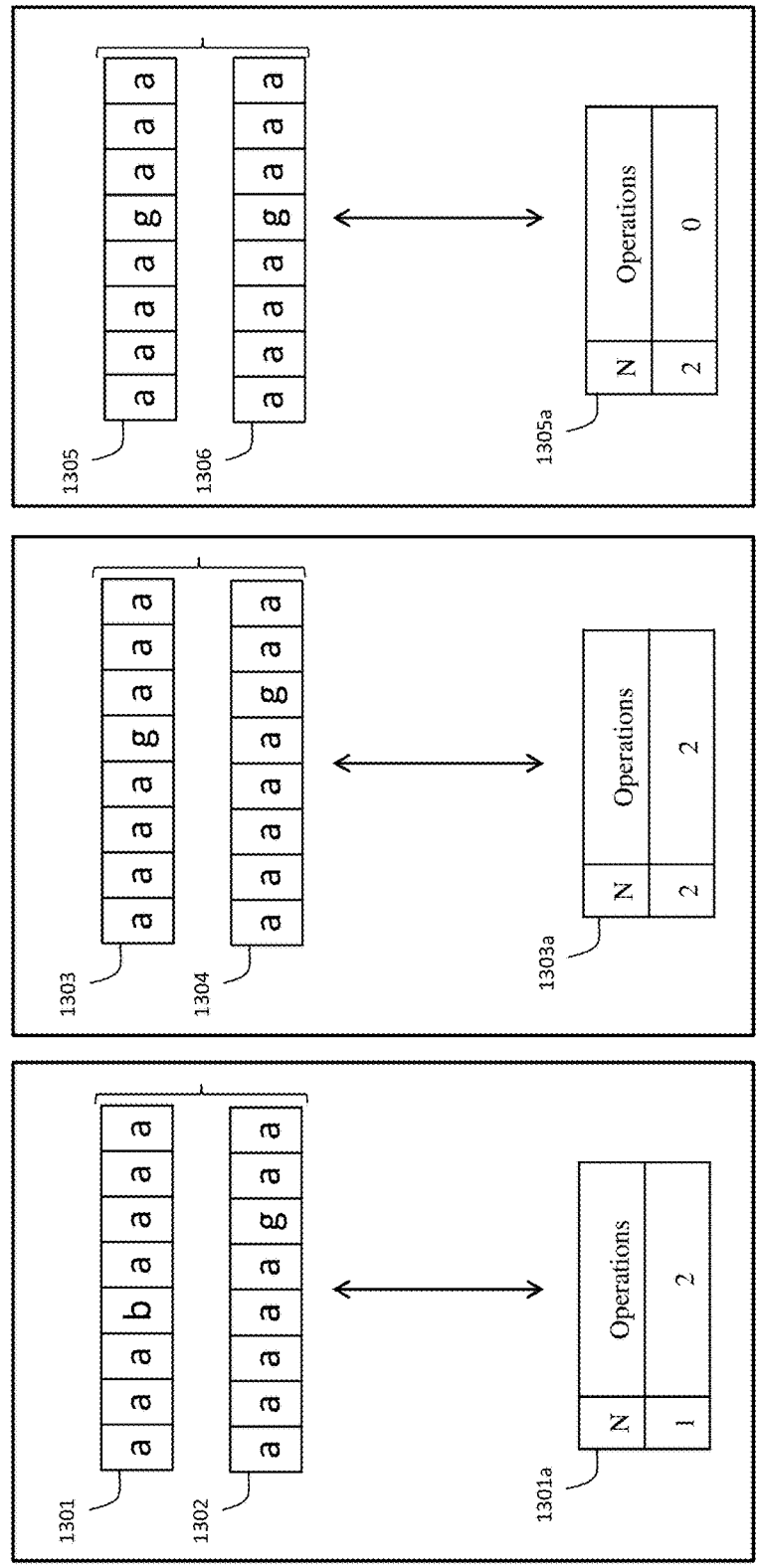

Fig. 14

Compute Distance Psuedocode

Fig. 15

Compute Distance Pseudocode

METHOD AND APPARATUS AND COMPUTER READABLE MEDIUM FOR COMPUTING STRING SIMILARITY METRIC

CROSS REFERENCE TO RELATED APPLICATIONS

This application is claiming priority based on United States Provisional Patent Application No. 61/923,097, filed Jan. 2, 2014, the contents of all of which are incorporated herein by reference in their entirety.

BACKGROUND

1. Field

The present disclosure broadly relates to the fields of databases and web services, and specifically, to characterizing string similarity.

2. Description of the Related Art

The description of the related art provided herein is for the purpose of generally presenting the context of the disclosure. Work of the presently named inventors, to the extent it is described in the background section, as well as aspects of the description that may not otherwise qualify as prior art at the time of filing, are neither expressly nor impliedly admitted as prior art against the present disclosure.

Today, a device measuring string similarity metrics typically determines the computational cost of converting a first string into a second string without considering a distance between the strings due to an insertion or deletion from the middle of a string. Commonly utilized string similarity metrics include metrics such as Edit-Distance, Hamming Distance, and Longest Common Subsequence (LCS).

The Edit-Distance (Levenshtein Distance) string similarity metric is used to determine the computational cost of making the minimum number of edits when converting a first string into a second string. The Edit-Distance metric includes operations of insertion, deletion, and substitution, with each operation having equivalent computational costs regardless of the location of the operation within the string. For example, when the Edit-Distance metric is used to determine the computational cost of converting a first string "abcefdgh" into a second string "abcdgh," the computational cost becomes two, as the delete operation was performed twice for the deletion of "e" and "f" from the first string. The Edit-Distance metric fails to account for the computational cost of shifting the remaining characters of the first string after the deletion operation.

The Hamming Distance string similarity metric is used to determine the computational cost of converting one string into another string as the number of differing positions between characters of two strings. For example, the Hamming Distance determines that the computational cost of converting between a first string "abcdefg" and a second "abxcdefg" is six, as six characters of the second string, "xcdefg" differ in position from that of the first string. As seen, the Hamming Distance may become large when a single differing character interposes the characters of the first string.

The LCS string similarity metric is used to determine the computational cost of converting one string into another string as the longest subsequence of characters shared between two strings. For example, the LCS determines that the computational cost of converting between a first string "abc" and a second string "acb" is two, as the LCS is either "ab" or "ac." The LCS does not take into account the distance of the characters between the two strings.

String similarity metrics gain importance when measuring the similarity between, for example, two domain names, nucleotide sequences, devices names, or other strings; however, current string similarity metrics do not account for shifting of the middle characters of a string. Further, because of the nature of such strings in view of the present metrics, an additional metric is needed to more sufficiently characterize strings wherein a middle character is shifted.

SUMMARY

According to an aspect of exemplary embodiments, a string similarity apparatus includes a memory configured to store a plurality of software instructions; and a processor configured to execute the plurality of software instructions including determining a first number of characters contained by a first string; determining a second number of characters contained by a second string; determining a larger number from among the first number and the second number; setting the larger number to a string length value; determining a maximum number of subsequent characters from the first string which match subsequent characters from the second string and setting the value; setting the maximum number to a maximum group size value; calculating a resulting value by subtracting the maximum group size value from the string length value; and outputting the resulting value which represents a computational cost of converting the first string into the second string.

According to an aspect of one or more exemplary embodiments, a string similarity apparatus includes a memory configured, where the resulting value is an upper-bound of a number of edits, to convert the first string into the second string; and the resulting value is a lower-bound of either of a number of the differing character positions and a least common subsequence between the first string and the second string.

According to an aspect of one or more exemplary embodiments, a string similarity apparatus includes analyzing the first string and the second string which further comprises determining an inclination between the subsequent characters of the first string matching the subsequent characters of the second string.

According to an aspect of one or more exemplary embodiments, a string similarity apparatus includes that the resulting value indicates the number of characters of the first string that are shifted during a computation due to an insertion in or a deletion from the middle of the first string.

According to an aspect of one or more exemplary embodiments, a string similarity apparatus includes that the resulting value corresponds to a plurality of computational operations wherein a maximum number said plurality of computational operations comprises $O(\Sigma_i^N n_i m_i)$, where N represents a number of unique characters which appear in both the first array and the second string, i represents a character, $n_i$ represents the number of repetitions of the character i in the first string, and $m_i$ represents the number of repetitions of the character i in the second string.

According to an aspect of one or more exemplary embodiments, a string similarity apparatus includes determining the maximum number further comprises forming linked list structure representing the characters of any of the first string relative to the characters of second string.

According to an aspect of one or more exemplary embodiments, a string similarity apparatus includes the processing calculator further configured to convert the first string into the second string when the computational cost meets a predetermined threshold.

According to an aspect of one or more exemplary embodiments, a string similarity apparatus includes a processing calculator configured to execute the plurality of software instructions a plurality of times, wherein each time is between a first string and one of a plurality of second strings.

According to an aspect of one or more exemplary embodiments, a string similarity apparatus includes a processing calculator configured to convert the first string into one of the plurality of second strings which result in the minimum resulting value.

According to an aspect of one or more exemplary embodiments, determining by a string similarity apparatus includes whether a string input by a user corresponds to a threshold string based on the output resulting value; converting the input string to the threshold string if the processor determines that the string corresponds to the threshold string and displaying the threshold string on a display.

According to an aspect of one or more exemplary embodiments, the outputting of a string similarity apparatus includes comprises transmitting the output resulting value via a network to a user apparatus.

According to an aspect of one or more exemplary embodiments, a non-transitory computer readable medium storing a program includes a plurality of software instructions; wherein a processor is configured to execute the plurality of software instructions comprising: receiving a first string; determining a database to search for other strings based on the first string; determining a first number of characters contained by a first string; determining a plurality of other numbers respectively corresponding to a number of characters contained by each of the other strings; determining a larger number from among the first number and the plurality of other numbers; setting the larger number to a string length value; determining a maximum number of subsequent characters from the first string which match subsequent characters from at least one of the other strings and setting the value; setting the maximum number to a maximum group size value; calculating a resulting value by subtracting the maximum group size value from the string length value; outputting the resulting value which represents a computational cost of converting the first string into the second string; and updating a database of strings based on a result of the execution of the plurality of software instructions, and so on.

BRIEF DESCRIPTION OF THE DRAWINGS

Certain aspects will become more apparent by describing in detail illustrative, non-limiting embodiments thereof with reference to the accompanying drawings, in which like reference numerals refer to like elements in the drawings.

FIG. 1 is a highly simplified illustrative drawing showing a string-similarity calculator configured and operative according to exemplary embodiments.

FIG. 2a is a highly simplified illustrative drawing showing a group of strings according to exemplary embodiments.

FIG. 2b is a highly simplified illustrative drawing showing a calculated compute-distance value according to exemplary embodiments.

FIG. 2c is a highly simplified illustrative drawing showing a group of strings according to exemplary embodiments.

FIG. 2d is a highly simplified illustrative drawing showing a calculated compute-distance value according to exemplary embodiments.

FIG. 3 is a highly simplified illustrative drawing showing a string-similarity calculator and a group of strings according to exemplary embodiments.

FIG. 4 is a highly simplified pseudocode illustrating concepts of operation according to exemplary embodiments.

FIG. 9a is a highly simplified illustrative drawing showing a group of strings according to exemplary embodiments.

FIG. 9b is a highly simplified illustrative drawing showing a group of strings according to exemplary embodiments.

FIG. 11a is a highly simplified illustrative drawing showing a group of strings according to exemplary embodiments.

FIG. 11b is a highly simplified illustrative drawing showing a comparison of string similarity calculation results according to exemplary embodiments.

FIG. 11c is a highly simplified illustrative drawing showing a comparison of string similarity calculation results according to exemplary embodiments.

FIG. 12a is a highly simplified illustrative drawing showing a group of strings according to exemplary embodiments.

FIG. 12b is a highly simplified illustrative drawing showing a comparison of string similarity calculation complexity according to exemplary embodiments.

FIG. 13a is a highly simplified illustrative drawing showing a group of strings and a number of string similarity calculation operations according to exemplary embodiments.

FIG. 13b is a highly simplified illustrative drawing showing a group of strings and a number of string similarity calculation operations according to exemplary embodiments.

FIG. 13c is a highly simplified illustrative drawing showing a group of strings and a number of string similarity calculation operations according to exemplary embodiments.

FIG. 14 is a highly simplified pseudocode illustrating concepts of operation according to exemplary embodiments.

FIG. 15 is a highly simplified pseudocode illustrating concepts of operation according to exemplary embodiments.

DETAILED DESCRIPTION OF EXEMPLARY EMBODIMENTS

Figure 5:
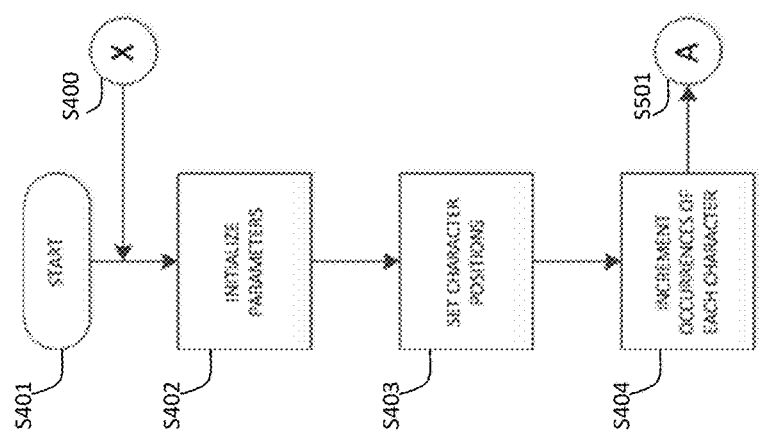
FIG. 5 is a flow diagram according to exemplary embodiments of a string-similarity calculator initialization and operation.

In the following detailed description of exemplary embodiments, reference will be made to the accompanying drawings, in which analogous functional elements are designated with same numerals. The aforementioned accompanying drawings show by way of illustration and not by way of limitation to further understanding of exemplary embodiments. These exemplary embodiments are described in sufficient detail to enable those skilled in the art to practice the inventive concept and it is to be understood that other implementations may be utilized and that structural changes and/or substitutions of various elements may be made without departing from the scope and spirit of inventive concept. The following detailed description of exemplary embodiments is, therefore, not to be construed in a limiting sense. Additionally, the various exemplary embodiments as described may be implemented in the form of software running on a general purpose computer, in the form of a specialized hardware, or a combination of software and hardware.

In exemplary, non-limiting embodiments, it is possible to compute string similarity metrics in various systems. In fact, exemplary, non-limiting embodiments may compute string similarity metrics in any web services. Some examples of the various systems in which string similarity metrics are computed include a server, a server cluster, a cloud, and other database systems. String similarity metrics are especially important in the context of services that involve domain name strings, devices name strings, nucleotide sequence strings or other strings.

FIG. 1 is a highly simplified illustrative drawing showing a string-similarity calculator configured and operative according to exemplary embodiments.

FIG. 1 shows a string similarity computation calculator 100 which includes an I/O device 102, a compute-distance calculator 103, and a memory 104. The string similarity computation calculator 100 is connected to devices 105 and networks 106.

The I/O device 102 allows for a communication between the string similarity computation calculator 100 and the devices 105. The string similarity computation calculator 100 is configured to be capable of receiving strings and commands to compare strings from any of the devices 105 and the networks 106. The string similarity computation calculator 100 is also capable of outputting the results of its operation to any of the devices 105 and networks 106. The string similarity computation calculator 100 is also configured to receive strings for similarity comparison from the memory 104 and, according to an exemplary embodiment; it is also configured to write subsequent operations and results to its memory 104.

The compute-distance calculator 103 is configured to receive a plurality of strings and subsequently compute the computational cost of converting a first string into another string while accounting for the computational cost of shifting the middle characters of the first string, i.e. the compute-distance. The compute-distance allows for the calculation of the computational cost of the distance of a string from another string due to an insertion of a character into or a deletion of a character from the middle of a string. The compute-distance metric consists of the following operations: detach, replace, and append. The concepts of operation of the compute-distance string similarity metric will become more apparent through its descriptions of exemplary embodiments herein.

The devices 105 transmit content such as a string to the compute-distance apparatus 100. The devices 105 may be remote from the compute-distance apparatus 100. In an exemplary embodiment, the devices 105 include a mobile terminal 105a such as a smartphone, a tablet or a laptop 105b, a IPTV 105c, a personal computer 105d, and so on, 105n such as a server, server cluster, or cloud. Each of the devices 105 may include one or more processors and a memory. The devices 105 may also be capable of transmitting multimedia data files such as video, audio, still images, and text files and any combination of the foregoing.

FIGS. 2a through 2d are highly simplified illustrative drawings showing concepts of operation according to exemplary embodiments.

FIG. 2a through 2d show a compute-distance calculation for the computational cost of the conversion 200 of a string 201 "abcgh" into another string 202 "axbcefdgh" and the cost of the conversion 210 of the string 202 "axbcefdgh" into the string 201 "abcgh."

FIG. 2a shows replaced characters 201b and appended characters 201c. FIG. 2b also shows compute-distance values 210: number of characters detached 205, number of characters replaced 204, number of characters appended 203, and compute-distance cost 206. The compute-distance cost 206 is a sum of all of the detach, replace, and append operations of the compute-distance metric.

First, the character "a" is appended, or added, to the string 201 before the character "a." That is, the string "abcgh" is now "aabcgh." This operation includes the append operation of the compute-distance metric. This operation increments the computational cost +1. Then, the second character, character "a," is replaced with "x;" this operation also increments the computational cost +1. The string is now "axbcgh."

Additionally, in the conversion from string 201 to string 202, characters "g" and "h" are replaced by characters "e" and "f," which increments the computational cost +2. The string is now "axbcef." Then, characters "d," "g" and "h" are appended at the end of the first string 201, and this operation increments the computational cost +3. The string 201 has been converted into string 202.

The compute-distance values 210 of FIG. 2d illustrate a tally of the computational costs associated with number of characters appended 203, number of characters replaced 204, and number of characters detached 205. The sum of which is illustrated by compute-distance cost 206. Therefore, the compute-distance string similarity metric determines that the compute-distance cost of converting string 201 "abcgh" into string 202 "axbcefdgh" is equal to seven, as four characters are appended ("a" and "dgh"), three characters are replaced ("x" and "ef"), and no characters is detached.

FIG. 2c shows detached characters 201a and replaced characters 201b. FIG. 2d also shows compute-distance values 210: number of characters detached 203, number of characters replaced 204, number of characters appended 205, and compute-distance cost 206. The compute-distance cost 206 is a sum of all of the detach, replace, and append operations of the compute-distance metric.

First, the first character "a" is detached from the string 202. That is, the string "axbcefdgh" is now "xbcefdgh." This operation includes the detach operation of the compute-distance metric. This operation increments the computational cost +1. Then, the second character, character "x," is replaced with "a;" this operation also increments the computational cost +1. The string is now "abcefdgh."

Additionally, in the conversion from string 202 to string 201, characters "e" and "f" are replaced by characters "g" and "h," which increments the computational cost +2. The string is now "abcghdgh." Then, the last three characters "d," "g" and "h" are detached from the end of the first string 201, and this operation increments the computational cost +3. The string 202 has been converted into string 201.

The compute-distance values 210 of FIG. 2d illustrate a tally of the computational costs associated with number of characters appended 203, number of characters replaced 204, and number of characters detached 205. The sum of which is illustrated by compute-distance cost 206. Therefore, the compute-distance string similarity metric determines that the compute-distance cost of converting string 202 "axbcefdgh" into string 202 "abcgh" is equal to seven, as four characters are detached ("a" and "dgh"), three characters are replaced ("x" and "ef"), and no characters are appended.

FIG. 3 is a highly simplified illustrative drawing showing concepts of operation according to exemplary embodiments.

Figure 4:
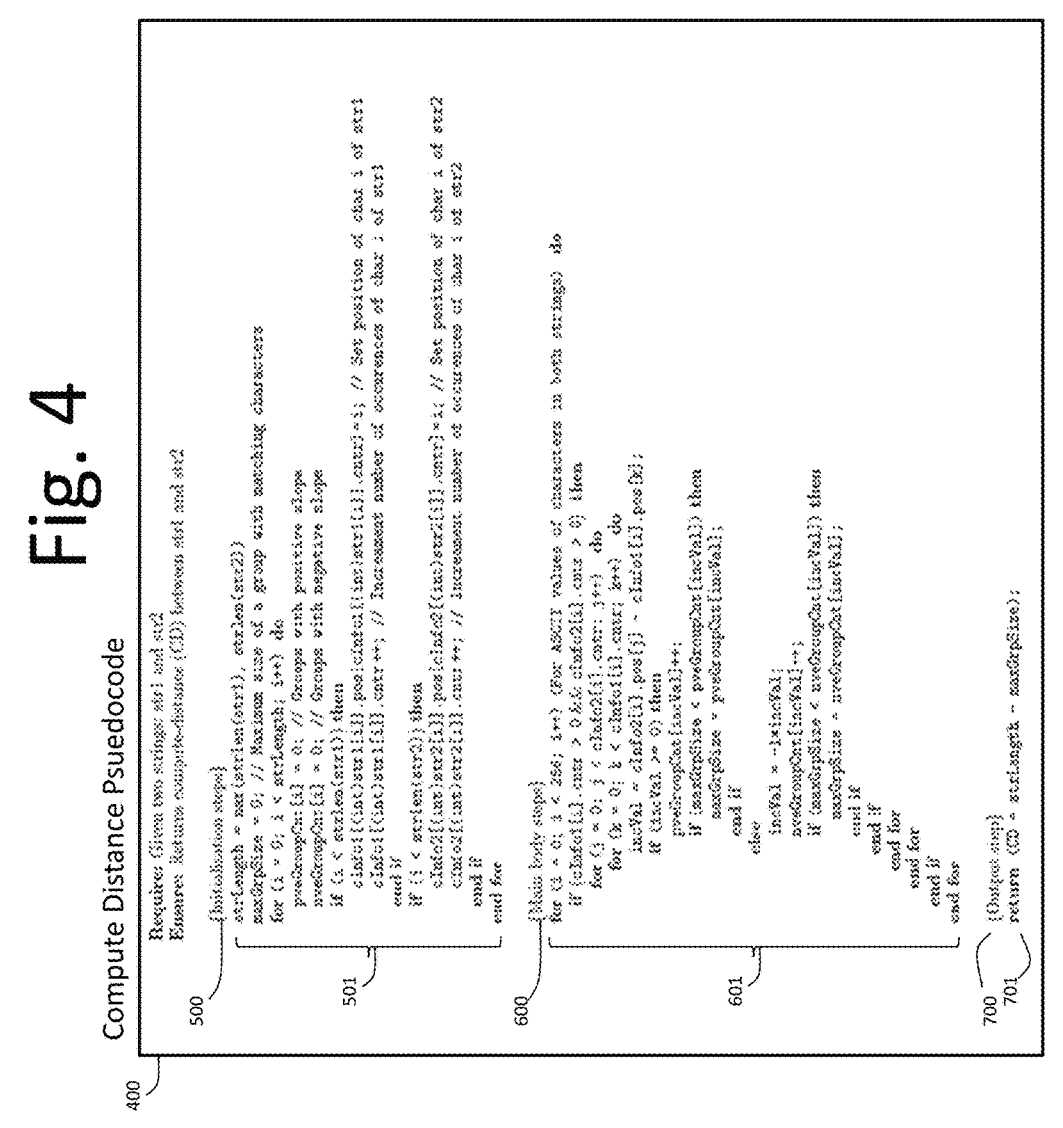

FIG. 3 shows a scenario wherein the compute-distance calculator 103 of the string similarity computation calculator 100 is loaded with a first array 305a and a second array 305b each corresponding respectively to a first string "mnabcdgp" and a second string "mabcfdg." A plurality of groups of parallel lines 310 are drawn indicating groups of subsequent matching characters with the same incline. The processing via the compute-distance metric of the first array 305a and the second array 305b are discussed below with respect to FIGS. 4-8.

FIG. 4 is a highly simplified pseudocode illustrating concepts of operation according to exemplary embodiments.

The pseudocode of FIG. 4 shows initialization 500, body 600, and output 700, with respective initialization steps 501, body steps 601, and output steps 701. The initialization steps 501, body steps 601, and output steps 701 are respectively discussed by FIGS. 5, 6, and 7.

Initialization 500 includes str1, str2, strLength, maxGrpSize, pveGroupCnt, nveGroupCnt, cInfo1, and cInfo2. StrLength relates to the maximum length, the number of characters, of either a first or a second string with the most number of characters. For example, if the first string had eight characters and the second string had nine characters, the strLength would equal nine, the number of characters of the longest string.

maxGrpSize relates to the largest group of characters from which groups of parallel lines may be drawn, see element 310 of FIG. 3. For example, the maxGrpSize of the arrays 305a and 305b of FIG. 3 is three, the number corresponding to group "abc."

pveGroupCnt and nveGroupCnt respectively relate to the positive and negative inclines of corresponding groups of matching characters, for example, the groups of parallel lines 310 of FIG. 3. According to a non-limiting exemplary embodiment, groups "m" and "abc" are both counted by the pveGroupCnt, and nveGroupCnt counts the group "dg." as the "abc" of first array 305a must be moved backwards, i.e. negatively, to the corresponding position of the second array 305b.

According to an exemplary embodiment in view of the construction of the pseudocode of the body steps 601, when a current group is analyzed, if the sum of current group size and the quantity of strLength minus the absolute value of the incline of the current group is less than the maxGrpSize, then it is possible to break from the corresponding loop of the pseudocode since there is no chance for a group size greater than the found maxGrpSize.

cInfo1 and cInfo2 respectively relate to the data structures of arrays, for example, the arrays 305a and 305b of FIG. 3, and illustrate the pseudocode for identifying groups of matching characters between two strings.

Figure 14:
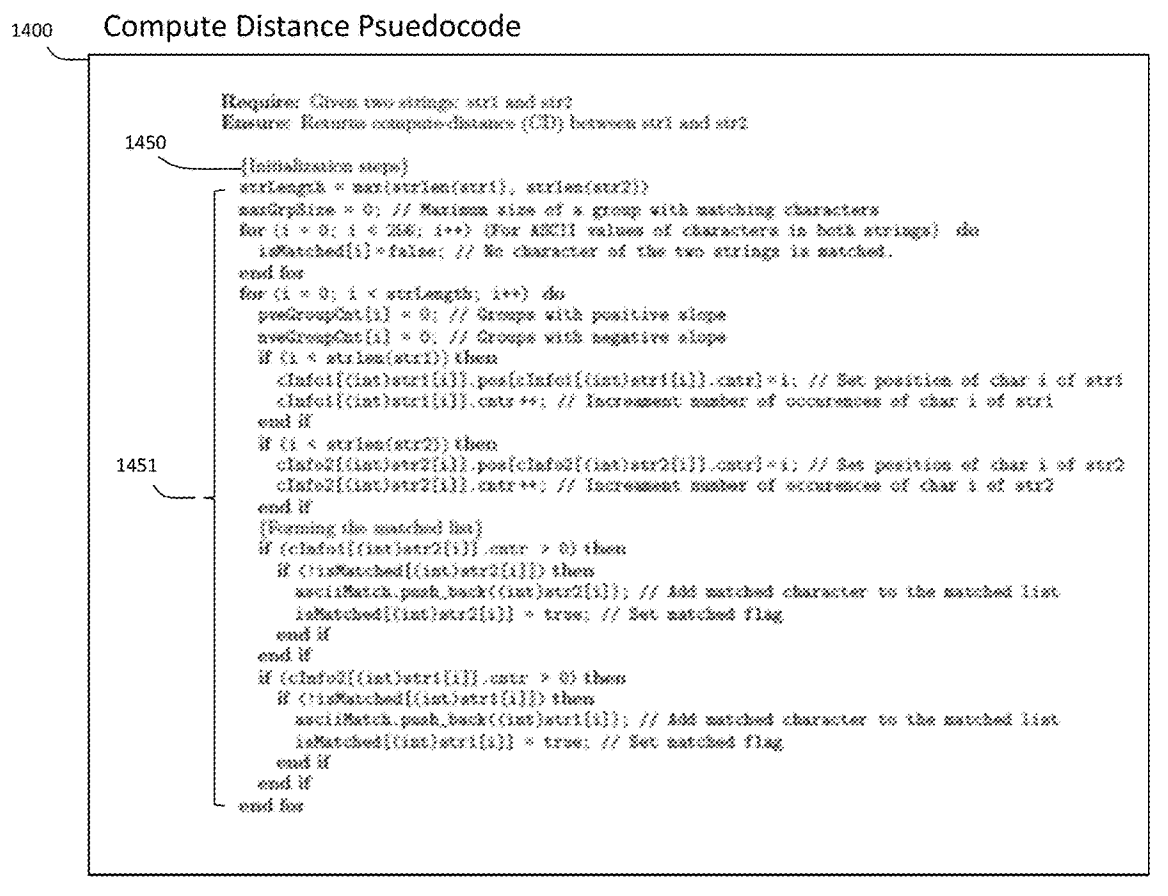

The pseudocode of FIG. 4 is merely non-limiting exemplary embodiment, and the compute-distance may be computed using other methods, the first loop of the ASCII characters in the body steps 601 may be replaced by a loop over a linked list of the cInfo1 and cInfo2 structures where cInfor1[i].cntr>0 and cInfo2[i]cntr>0, see for example FIG. 14 wherein a non-limiting exemplary pseudocode using a linked list of the ASCII value i's of matching characters in a first string, str1, and a second string, str2.

FIG. 5 is a flow diagram of an exemplary method according to exemplary embodiments.

The exemplary method 400 of FIG. 5 may be applied to multiple exemplary embodiments wherein the string similarity computation calculator is utilized. At S401 the string similarity computation calculator is ready to compute the cost of converting a first string into a second string.

At S402, the string similarity computation calculator initializes parameters such as the arrays of each string. Processing then continues to S403.

At S403, the string similarity computation calculator sets and prepares to increment values such as strLength, maxGrpSize, pveGroupCnt, nveGroupCnt, cInfo1, and cinfo2. Processing then continues to S404.

At S404, the string similarity computation calculator sets and prepares to increment occurrences of each character relative to the other characters in each string. Processing then continues to S501 as shown by FIG. 6.

Figure 6:
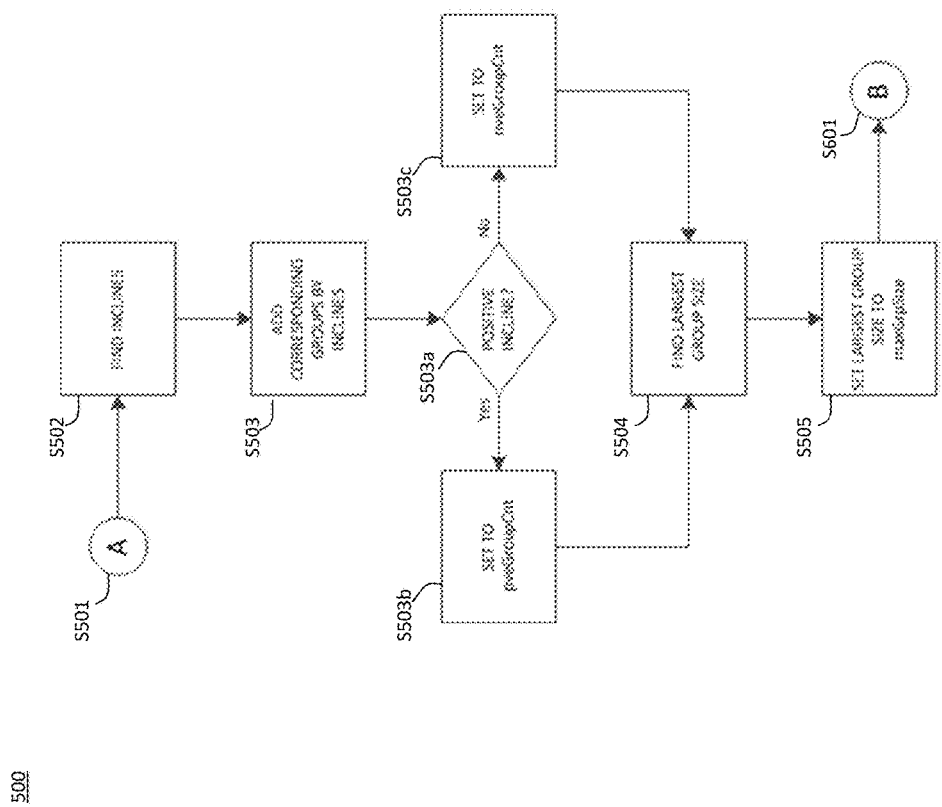
FIG. 6 is a flow diagram according to exemplary embodiments of a string-similarity calculator operation.

FIG. 6 is a flow diagram of an exemplary method according to exemplary embodiments.

The exemplary method 500 of FIG. 6 may be applied to multiple exemplary embodiments wherein the string similarity computation calculator is utilized. At S501 the string similarity computation calculator is ready to find the inclines of lines connecting matching characters from one array to the other. The maximum incline may be found when the last character of a first string matches first character of a second string. Likewise, the minimum incline may be found when the first character of the first string, matches the last character of the second string, see FIGS. 10a and 10b. Returning to FIG. 6, the processing continues at S502.

At S502 the string similarity computation calculator finds the inclines of the lines from the array of one string to the array of the other string. Processing then continues to S503.

At S503, the string similarity computation calculator adds groups of subsequent matching characters with the same incline to respective groups. At S503a, the string similarity computation calculator determines if a currently examined group has a positive incline.

At S503b, the string similarity computation calculator determined that the currently examined group has a positive incline, and subsequently sets the group and number of characters within the group to the pveGroupCnt. Processing continues at S504.

At S503c, the string similarity computation calculator determined that the currently examined group does not have a positive incline, and subsequently sets the group and number of characters within the group to the nveGroupCnt. Processing continues at S504.

At S504d, the string similarity computation calculator determines if there is another group. Processing continues at S503a if there is another group. Processing continues at S505 if there is not another group.

At S505, the string similarity computation calculator determines the largest group, for example, maxGrpSize, based on the number of characters within each group. Processing continues at S601 as shown by FIG. 7.

Figure 7:
FIG. 7 is a flow diagram according to exemplary embodiments of a string-similarity calculator operation.

FIG. 7 is a flow diagram of an exemplary method according to exemplary embodiments.

The exemplary method 600 of FIG. 7 may be applied to multiple exemplary embodiments wherein the string similarity computation calculator is utilized. At S601, the string similarity computation calculator is ready to calculate the compute-distance computational cost of converting a first string into a second string. The processing continues at S602.

At S602, the string similarity computation calculator subtracts the size of the largest group from the size of the largest string. The largest group being of subsequently matching characters with parallel lines connecting the characters of the two arrays, for example as characterized by maxGrpSize.

At S603, the string similarity computation calculator outputs the result of the computation of S602. Processing continues to S400 of FIG. 5.

Figure 8:
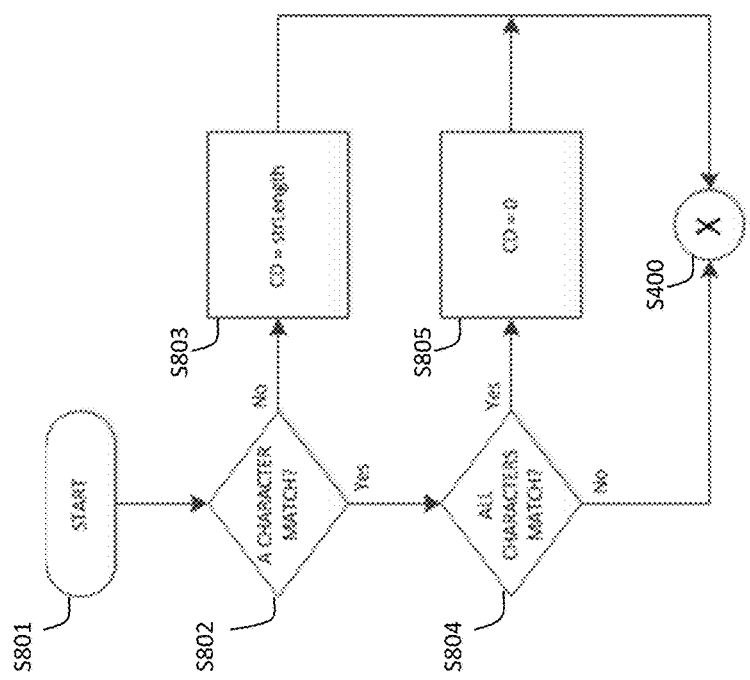
FIG. 8 is a flow diagram according to exemplary embodiments of a string-similarity calculator operation.

FIG. 8 is a flow diagram of an exemplary method according to exemplary embodiments.

The exemplary method 800 of FIG. 8 may be applied to multiple exemplary embodiments wherein the string similarity computation calculator is utilized. At S801, the string similarity computation calculator is ready to determine if there are any matching characters between the strings. The processing continues at S802.

At S802, the string similarity computation calculator determines if there are any matching characters between the strings. The processing continues at S803 if there are not any matching characters between the strings. The processing continues at S804 if there are any matching characters between the strings.

At S803, the string similarity computation calculator determined that there are no matching characters between the strings, and the calculator subsequently outputs that the compute-distance value is equal to the length of the longest string, for example strLength, as the computational cost reflects that each character of the first string must be converted to that of the second string. Processing continues at S400.

At S804, the string similarity computation calculator determined that there are matching characters between the strings, and the calculator subsequently determines if all of the characters and their respective positions match between the two strings. Processing continues at S805, if all of the characters match, as described. Processing continues at S400 if all of the characters do not match, as described.

At S805, the string similarity computation calculator determined that all of the characters between the strings match as described, and the calculator subsequently outputs that the compute-distance value is equal to zero, as there is no computational cost of conversion as the first string entirely matches the second string.

FIGS. 9a and 9b are highly simplified illustrative drawings showing concepts of operation according to exemplary embodiments.

FIGS. 9a and 9b illustrates a first array 305a of "mnabcdgp", a second array 305b of "mabcefdg", a strLength table 306, a maxGrpSize table 307, the compute-distance cost table 308, and groups of parallel lines 310.

The groups of parallel lines 310 include a first group 310a, a second group 310b, and a third group 310c. The srtLength table 306 includes the length of the string contained by the first array 305a, the length of the string contained by the second array 305b, and the strLength, which corresponds to the number of characters contained by the longest string. The maxGrpSize table 307 includes both the sizes and inclines of the groups of parallel lines 310 as well as the maxGrpSize, which corresponds to the number of characters contained by the longest group. The compute-distance cost table 308 contains the strLength, the maxGrpSize, and the Compute-Distance value.

The string similarity computation calculator sets the strLength by determining the length of the longest string contained by either the first array 305a or the second array 305b. As illustrated by strLength table 306, the string similarity computation calculator determines that both the first array 305a and the second array 305b contain the same number of indices, i.e. eight, and therefore sets the strLength to the value of eight. According to an exemplary embodiment, the strLength value is necessary for determining the computational cost of converting the first array 305a into the second array 305b according to the compute-distance calculation.

The computational cost of converting the first array 305a into the second array 305b may be determined by comparing the largest of the groups of parallel lines 310 with the length of the largest string and relating the resultant value with the strLength. To find the groups of parallel lines 310, the string similarity computation calculator determines groups of subsequent matching characters with the same incline between the first array 305a and the second array 305b.

The character "m" is found at the same position in both the first array 305a and the second array 305b. The exemplary arrays do not both contain immediately subsequent matching characters following the character "m," and thus the string similarity computation calculator sets a Group 1 to have a size of 1 and an incline of +0, as illustrated by the maxGrpSize table 307.

The subsequent characters "abc" are found at different positions of the first array 305a and the second array 305b. The string similarity computation calculator sets a Group 2 to have a size of 3, corresponding to the three characters, and an incline of +1, as the "abc" of the first array 305a must be positively shifted to the corresponding position of the second array 305b. The tally is illustrated by the Group 2 column of the maxGrpSize table 307.

The subsequent characters "dg" are found at different positions of the first array 305a and the second array 305b. The string similarity computation calculator sets a Group 3 to have a size of 2, corresponding to the two characters, and an incline of −1, as the "dg" of the first array 305a must be negatively shifted to the corresponding position of the second array 305b. The tally is illustrated by the Group 3 column of the maxGrpSize table 307.

According to an exemplary embodiment, once the string similarity computation calculator has determined the strLength and the maxGrpSize, the compute-distance value is output as the maxGrpSize value subtracted from the strLength. In this example of FIGS. 9a and 9b, the maxGrpSize is equal to three, and the strLength is equal to 8. Accordingly, the compute distance value, as calculated from the maxGrpSize subtracted from the strLength is equal to five, as illustrated by the compute-distance cost table 308.

Figure 10B:
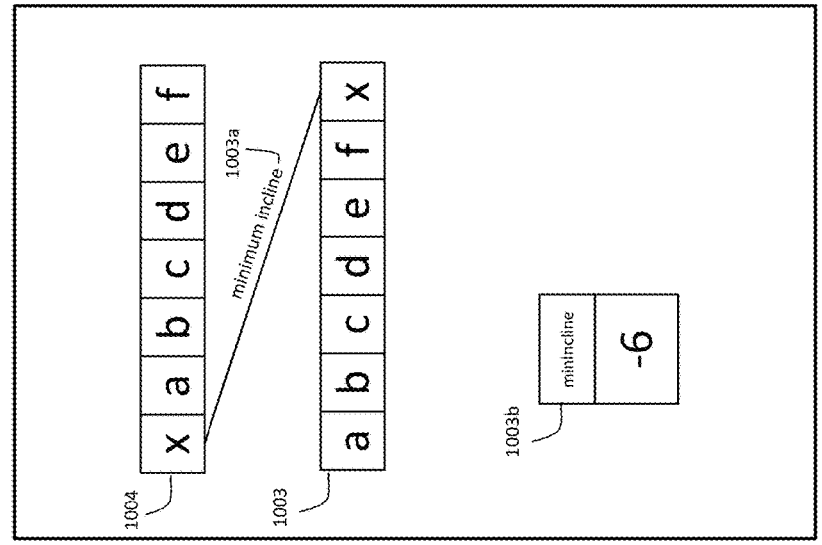
FIG. 10b is a highly simplified illustrative drawing showing a group of strings and inclines according to exemplary embodiments.
Figure 10A:
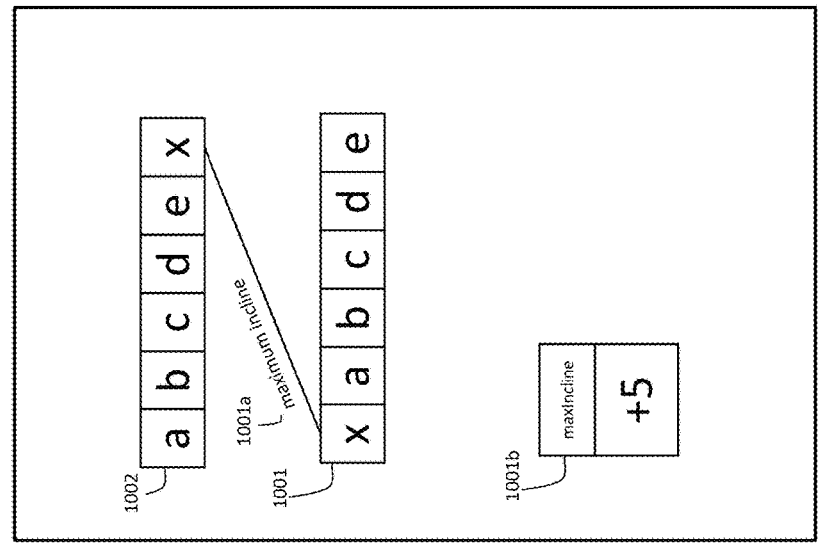
FIG. 10a is a highly simplified illustrative drawing showing a group of strings and inclines according to exemplary embodiments.

FIGS. 10*a* and 10*b* are highly simplified illustrative drawings showing concepts of operation according to exemplary embodiments.

FIG. 10*a* illustrates a first array 1001 with characters "xabcde", a second array 1002 with characters "abcdex", a maximum incline 1001*a*, and a maxIncline table 1001*b*. According to an exemplary embodiment, the string similarity computation calculator is configured to determine the maximum incline when the first character contained by a first array matches the last character contained by a second array. According to the example of FIG. 10*a*, the first character, "x", of the first array 1001 corresponds to the last character of second array 1002, as indicated by the line of the maximum incline 1001*a*. The character "x" of the first array 1001 must be positively shifted by five indices to match the characters contained by the second array 1002, and this value is indicated by the maxIncline table 1001*b*.

FIG. 10*b* illustrates a third array 1003 with characters "abcdefx", a fourth array 1004 with characters "xabcdef", a minimum incline 1003*a*, and a minIncline table 1003*b*. According to an exemplary embodiment, the string similarity computation calculator is configured to determine the minimum incline when the last character contained by a first array matches the first character contained by a second array. According to the example of FIG. 10*b*, the last character, "x", of the first array 1003 corresponds to the first character of second array 1002, as indicated by the line of the maximum incline 1001*a*. The character "x" of the third array 1003 must be negatively shifted by six indices to match the characters contained by the fourth array 1004, and this value is indicated by the minIncline table 1003*b*.

The maximum incline 1001*a* and minimum incline 1003*a* are used as indicators of scenarios such as when two strings are mirrored, that is to say that characters in ascending order in a first string (e.g. "abc") are in descending order in a second string (e.g. "cba"); however, this is merely an example and other required conditions may or may not be met during analysis.

FIGS. 11*a*, 11*b*, and 11*c* are highly simplified illustrative drawings showing concepts of operation according to exemplary embodiments.

FIGS. 11*a*, 11*b*, and 11*c* illustrate a first array 1101, a second array 1102, a table 1103, and a relation 1104. According to this exemplary embodiment, the first array 1101 contains the characters of a domain name as follows: "www.neustar.com". The second array 1102 contains the characters of a misspelled domain name of the first array 1101 as follows: "www.nustar.com", the character "e" is not present in the second array 1102.

The table 1103 illustrates the computational costs of various string similarity calculations such as Edit-Distance, Compute-Distance, Hamming Distance, and LCS. The Edit-Distance assumes the operations of insertion, deletion, and substitution, and in view of the first array 1101 and second array 1102, the character "e" is to be deleted. Thus, the Edit-Distance results in a computational cost of one, as illustrated by the table 1103.

According to an exemplary embodiment, the compute-distance is determined by subtracting the length of the largest group of parallel lines of subsequent matching characters, between the first array 1101 and the second array 1102, from length of the longest string, which is the length of the first array 1101. Thus, the Compute-Distance results in a computation cost of 6, as illustrated by the table 1103.

The Hamming Distance yields the number of positions of differing characters of the first array 1101 and second array 1102. The position of the characters "eustar.com" differ from the first array 1101 when compared to the second array 1102. Thus, the Hamming Distance results in a computational cost of ten, as illustrated by the table 1103.

The LCS yields the number of the longest subsequence of characters shared the first array 1101 and second array 1102. The LCS of the first array 1101 when compared to the second array 1102 is "www.nustar.com". Thus, the LCS results in a value of 14, as illustrated by the table 1103.

The relation 1104 illustrates a boundary relationship characterized by the string-similarity comparisons. Accordingly, the boundary relationship illustrates "Edit-Distance≤Compute-Distance≤(Hamming Distance OR LCS)" where the compute-distance may be the upper-bound of the Edit-Distance and also the lower-bound of each of the Hamming Distance and LCS comparisons.

FIGS. 12*a* and 12*b* are highly simplified illustrative drawings showing concepts of operation according to exemplary embodiments.

FIGS. 12*a* and 12*b* illustrate a first array 1201, a second array 1202, and a table 1203. The first array contains the characters "aadddggggg", and the second array contains the characters "aaadddgggg". The table 1203 illustrates a comparison between the computational complexity of using either Edit-Distance or Compute-Distance on the first array 1201 and the second array 1202.

The table 1203 illustrates an exemplary embodiment wherein the complexity of either method is illustrated by big-O notation comprising n, m, N, i, $n_i$, and $n_i$; where n represents the number of characters in the first array 1201, m represents the number of characters in the second array 1202, N represents the number of unique characters which appear in both the first array 1201 and the second array 1202, i represents a character, $n_i$ represents the number of repetitions of character i in the first array 1201, and $m_i$ represents the number of repetitions of character i in the second array 1202.

As illustrated by table 1203, the computational complexity of the Edit-Distance results in $O(nm)=10*10=100$, while the computational complexity of the Compute-Distance merely results in $O(\Sigma_i^N n_i m_i)=2*3+3*3+5*4=35$. Although, according to this exemplary embodiment, like characters subsequently follow each other as illustrated by the arrays of FIG. 12, this is merely an exemplary embodiment, and the characters may be scrambled without increasing the computational complexity of the Compute-Distance. Accordingly, the Compute-Distance has a lower computational complexity than that of the Edit-Distance.

According to an exemplary embodiment, the worst-case computational complexity of the Compute-Distance may be obtained by maximizing the formula, $\Sigma_i^N n_i m_i$, subject to the following constraints: $\Sigma_i^N n_i < n$, $\Sigma_i^N m_i < m$, $n_i > 1$, and $4 \leq N \leq \min(n, m)$ where min is a minimum function and n and m are the lengths of the first and second strings.

FIG. 13*a* is a highly simplified illustrative drawing showing concepts of operation according to exemplary embodiments.

FIG. 13*a* illustrates a first array 1301, a table 1301*a*, and a second array 1302. FIG. 13*a* illustrates an exemplary embodiment wherein N<4, i.e. N=1, that is to say that the strings contained by the first array 1301 and the second array 1302 comprise one matching distinct character, i.e. "a". The worst-case complexity for this scenario is when $n_i = n-1$ and $m_i = m-1$; because $(n-1)*(m-1) > [(n-i)*(m-j)+(i*j)]$, where $1 < i < n-1$ and $1 < j < m-1$. In the exemplary embodiment, the Compute-Distance between the first array 1301 and the second array 1302 is equal to two, as illustrated by the table 1301a. That is to say that two replace operations may be performed, i.e. replacing "b" and "g" of the first array 1301 with the character "a".

FIG. 13b is a highly simplified illustrative drawing showing concepts of operation according to exemplary embodiments.

FIG. 13b illustrates a first array 1303, a table 1303a, and a second array 1304. FIG. 13b illustrates an exemplary embodiment wherein N<4, i.e. N=2, that is to say that the strings contained by the first array 1303 and the second array 1304 comprise two matching distinct characters, i.e. "a" and "g". In the exemplary embodiment, the Compute-Distance between the first array 1303 and the second array 1304 is equal to two, as illustrated by the table 1303a. That is to say that two replace operations may be performed, i.e. replacing "b" and "g" of the first array 1303 with the character "a".

FIG. 13c is a highly simplified illustrative drawing showing concepts of operation according to exemplary embodiments.

FIG. 13c illustrates a first array 1305, a table 1305a, and a second array 1306. FIG. 13c illustrates an exemplary embodiment wherein N<4, i.e. N=2, that is to say that the strings contained by the first array 1305 and the second array 1306 comprise two matching distinct characters, i.e. "a" and "g". In the exemplary embodiment, the Compute-Distance between the first array 1303 and the second array 1304 is equal to zero, as illustrated by the table 1303a. That is to say that no Compute-Distance operations should be performed, i.e. the position of all distinct characters shared between the first array 1303 and the second array 1304 are equal.

FIG. 14 is a highly simplified pseudocode illustrating concepts of operation according to exemplary embodiments.

The pseudocode of FIG. 14 shows initialization 1450 and initialization steps 1451. Initialization 1450 includes str1, str2, strLength, maxGrpSize, isMatched; pveGroupCnt, nveGroupCnt, cInfo1, and cInfo2. The initialization 1450 forms a linked list over the character i structures.

First and second strings relate respectively to the str1 and str2 arrays. StrLength relates to the maximum length, the number of characters, of either a first or a second string with the most number of characters. For example, if the first string had eight characters and the second string had nine characters, the strLength would equal nine, the number of characters of the longest string.

maxGrpSize relates to the largest group of characters from which groups of parallel lines may be drawn, see element 310 of FIG. 3. pveGroupCnt and nveGroupCnt respectively relate to the positive and negative inclines of corresponding groups of matching characters and cInfo1 and cInfo2 respectively relate to the data structures of arrays.

Figure 15:
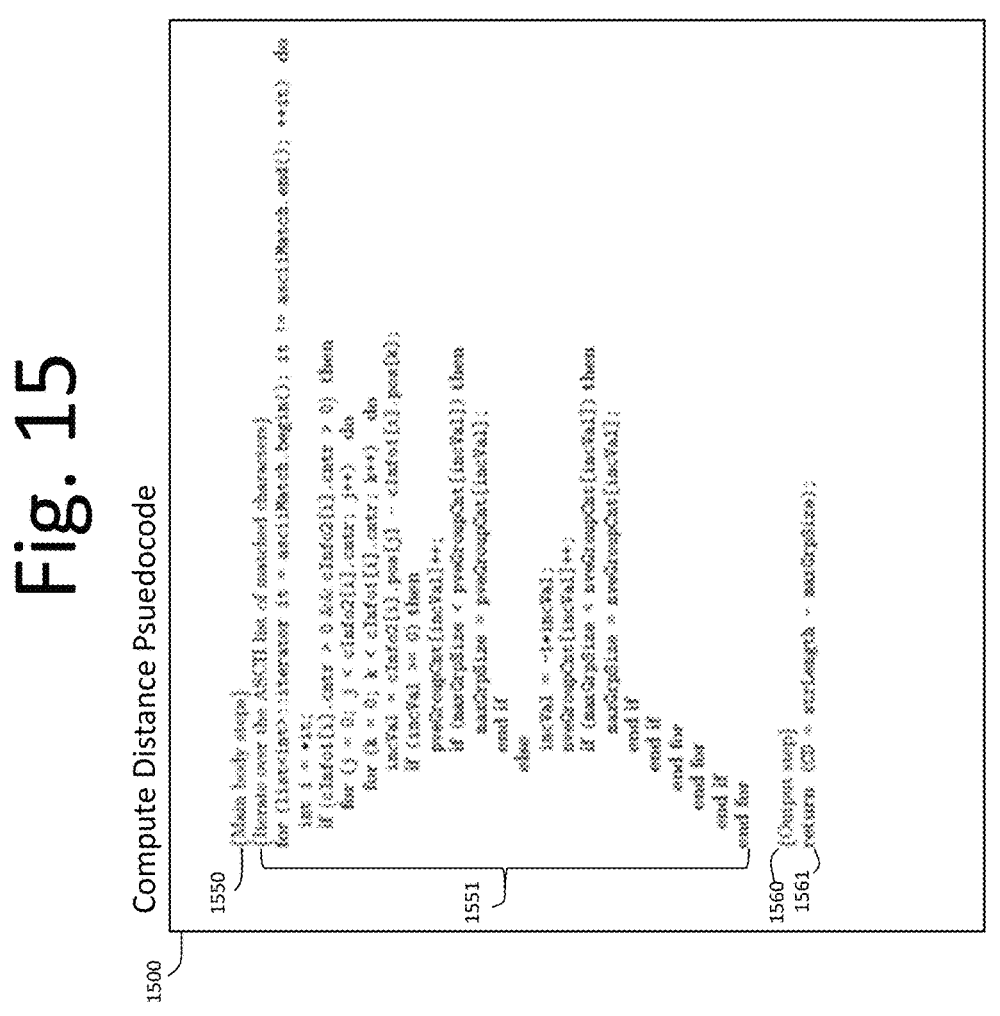

FIG. 15 is a highly simplified pseudocode illustrating concepts of operation according to exemplary embodiments.

The pseudocode of FIG. 15 shows main body 1550, output 1560, main body steps 1551, and output steps 1561. The main body steps 1551 are iterated over the ASCII list of matched characters. According to an example embodiment, the main body steps 1551 correspond to the linked list formed over the character i structures.

Figure 16:
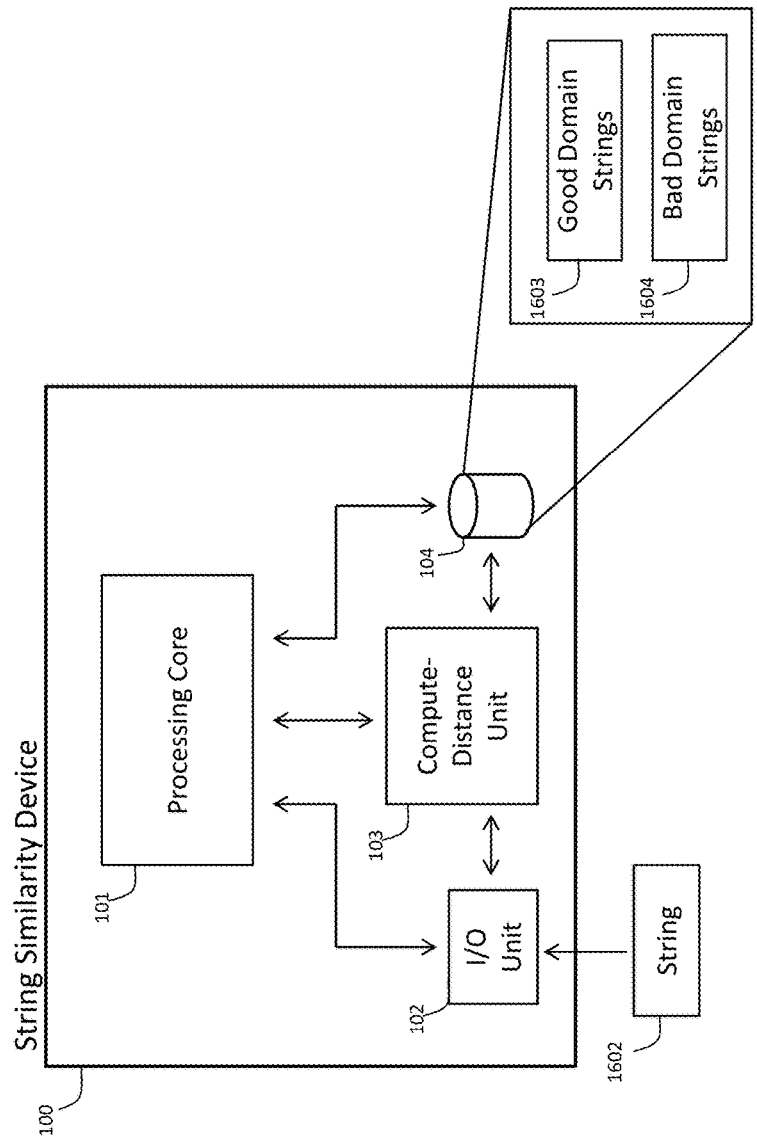
FIG. 16 is a highly simplified illustrative drawing showing a string-similarity calculator with a memory of domain names according to exemplary embodiments.

FIG. 16 is a highly simplified illustrative drawing showing concepts of operation according to exemplary embodiments.

FIG. 16 shows a string 1602 and a string similarity computation calculator 100 which includes an I/O device 102, a compute-distance calculator 103, and a memory 104 substantially similar to the string similarity computation calculator 1000 of FIG. 1.

The memory 104 contains a list of good domain name strings (GDNstring(s)) 1603 and a list of bad domain name strings (BDNstring(s)) 1604.

According to an exemplary embodiment the string 1602 is input to the string similarity computation calculator 100. Compute-distance between the string 1602 and each of the GDNstrings and BDNstrings contained within the memory 104 will be computed.

Figure 17:
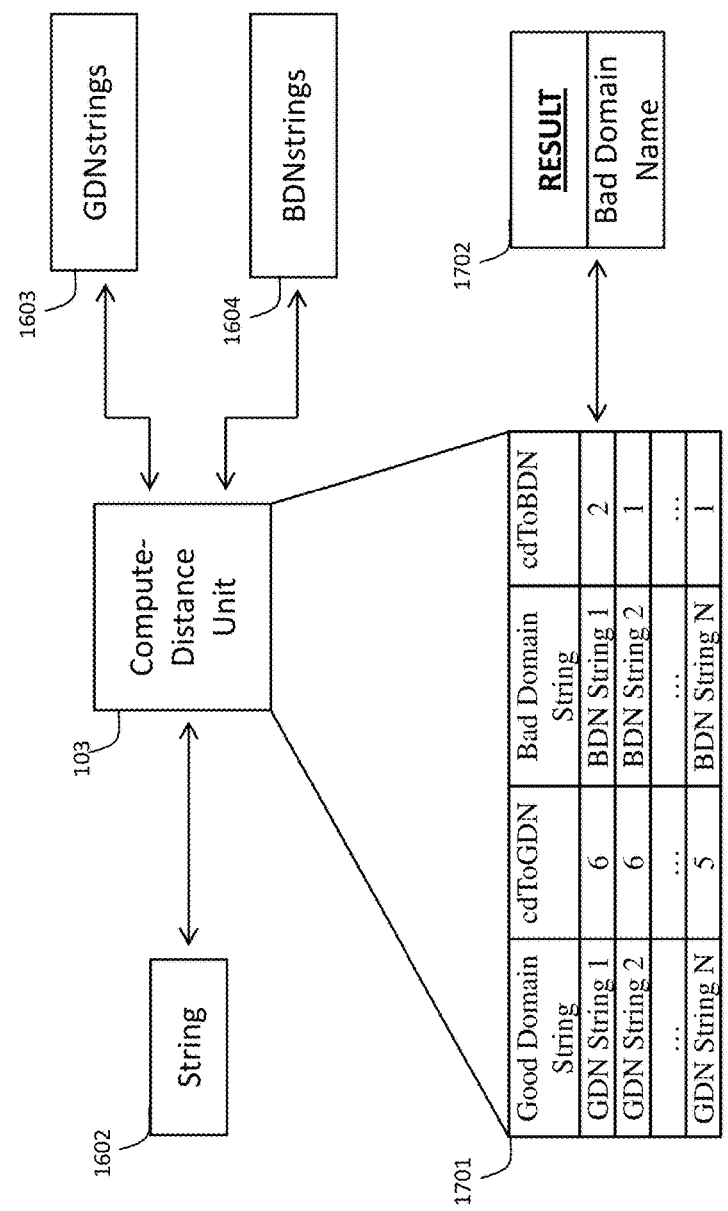
FIG. 17 is a highly simplified illustrative drawing showing a string-similarity calculator with a memory of domain names according to exemplary embodiments.

FIG. 17 is a highly simplified illustrative drawing showing concepts of operation according to exemplary embodiments.

FIG. 17 shows a string 1602, a compute-distance calculator 103, a list of GDNstrings 1603, a list of BDNstrings 1604, table 1701, and table 1702.

The compute-distance of the string 1602 is to be taken with respect to each string of the GDNstrings 1603. The compute-distance of the string 1602 is to be also taken with respect to each string of the BDNstrings 1604.

The table 1701 shows exemplary results where each value of the cdToGDN represents the compute-distance found, by the compute-distance calculator 103, between the string 1602 and each of the strings of the GDNstrings 1603. The table 1701 also shows exemplary results where each value of the cdToBDN represents the compute-distance found, by the compute-distance calculator 103, between the string 1602 and each of the strings of the BDNstrings 1604.

The table 1702 shows the result of the compute-distance calculator 103 comparison among the strings of the GDNstrings 1603 and BDNstrings 1604 respectively. According to this exemplary embodiment, the cdToBDN among the BDNstrings 1604 is found to be less than the cdToGDN among the GDNstrings 1603. Accordingly, the string 1602 is found by the compute-distance calculator 103 to be more similar to the BDNstrings 1604 when compared with the results of the comparison with the GDNstrings 1603. However, this is merely an exemplary embodiment, and the string 1602 may be found by the compute-distance calculator 103 to be more similar to the GDNstrings 1603.

Figure 18:
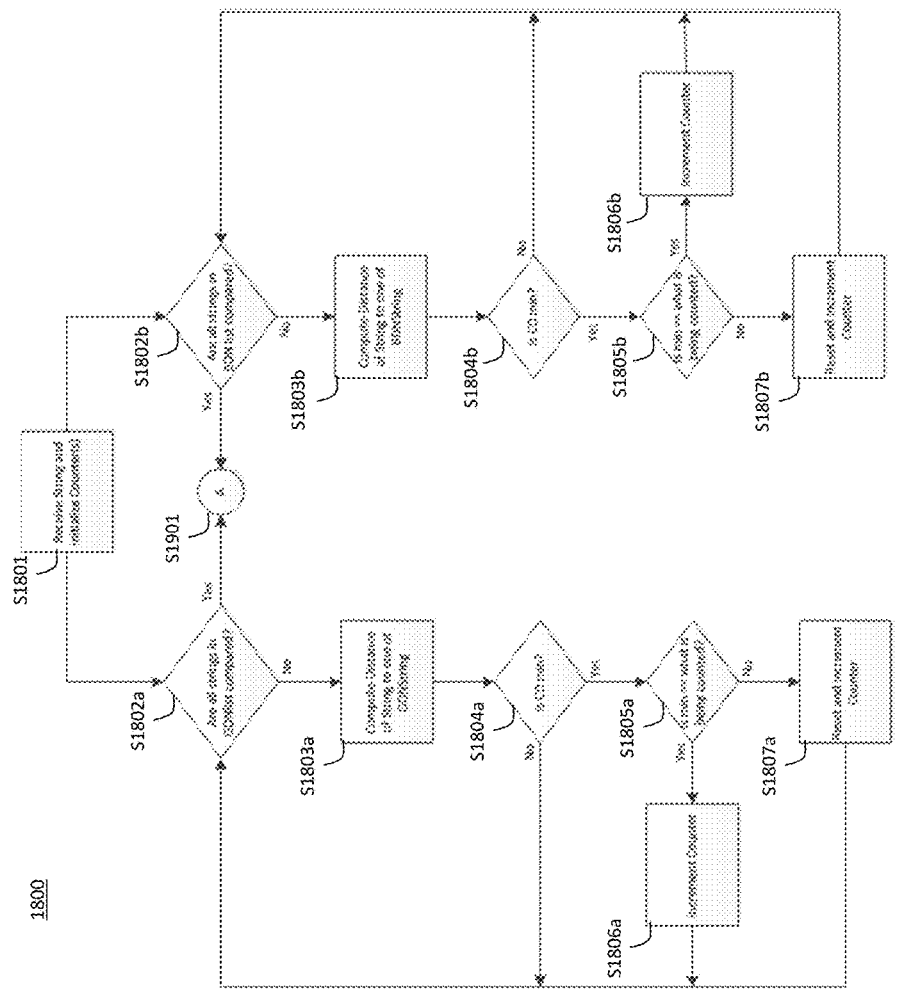
FIG. 18 is a flow diagram according to exemplary embodiments of a string-similarity calculator operation.

FIG. 18 is a flow diagram of methods according to exemplary embodiments.

The exemplary method 1800 of FIG. 18 may be applied to multiple exemplary embodiments wherein the string similarity computation calculator is utilized.

At S1801, the string similarity calculator receives a string and initializes a GDNcounter and a BDNcounter. The counter will count the number of strings found to have the minimum compute distance, according to an exemplary embodiment. Processing continues at S1802a and S1802b.

At S1802a, the string similarity calculator determines if the string has been compared with all available strings in the GDNlist, where the GDNlist corresponds to the GDNstrings 1603 of FIG. 17. If at S1802a, the string similarity calculator determines that each string in the GDNlist has not been compared with the string, processing continues at S1803a. If at S1802a, the string similarity calculator determines that each string in the GDNlist has been compared with the string, processing continues at S1901.

At S1803a, the string similarity calculator determines the compute-distance between the string and one of the strings of the GDNlist. Processing continues at S1804a.

At S1804a, the string similarity calculator determines if compute-distance, found at step S1803a, is the minimum compute-distance found, so far, by the string similarity calculator. If the string similarity calculator determines that the compute-distance, found at S1803a, is not the minimum-compute distance found, so far, the processing continues at S1802a. If the string similarity calculator determines that the compute-distance, found at S1803a, is the minimum compute-distance found so far, the processing continues at S1805a.

At S1805a, the string similarity calculator determines if the compute-distance, found at S1803a, is the minimum compute-distance found, so far, by the string similarity calculator. If the string similarity calculator determines that the compute-distance, found at S1803a, is not the minimum compute-distance found, so far, processing continues at S1806a. If the string similarity calculator determines that the compute-distance, found at S1803a, is the minimum compute-distance found, so far, processing continues at S1807a.

At S1806a, the string similarity calculator increments the GDNcounter, and thereby keeps a count of how many compute-distance values have been found, at S1803a, corresponding to the minimum compute-distance value of the string to any of the strings of the GDNlist. Processing continues at S1802a.

At S1807a, the string similarity calculator resets the GDNcounter and increments the GDNcounter corresponding to the newly found minimum compute-distance value, found at S1803a. Processing continues at S1802a.

At S1802b, the string similarity calculator determines if the string has been compared with all available strings in the BDNlist, where the GDNlist corresponds to the BDNstrings 1604 of FIG. 17. If at S1802b, the string similarity calculator determines that each string in the BDNlist has not been compared with the string, processing continues at S1803b. If at S1802b, the string similarity calculator determines that each string in the BDNlist has been compared with the string, processing continues at S1901.

At S1803B, the string similarity calculator determines the compute-distance between the string and one of the strings of the BDNlist. Processing continues at S1804b.

At S1804b, the string similarity calculator determines if compute-distance, found at step S1803b, is the minimum compute-distance found, so far, by the string similarity calculator. If the string similarity calculator determines that the compute-distance, found at S1803b, is not the minimum-compute distance found, so far, the processing continues at S1802b. If the string similarity calculator determines that the compute-distance, found at S1803b, is the minimum compute-distance found so far, the processing continues at S1805b.

At S1805b, the string similarity calculator determines if the compute-distance, found at S1803b, is the minimum compute-distance found, so far, by the string similarity calculator. If the string similarity calculator determines that the compute-distance, found at S1803b, is not the minimum compute-distance found, so far, processing continues at S1806b. If the string similarity calculator determines that the compute-distance, found at S1803b, is the minimum compute-distance found, so far, processing continues at S1807b.

At S1806b, the string similarity calculator increments the BDNcounter, and thereby keeps a count of how many compute-distance values have been found, at S1803b, corresponding to the minimum compute-distance value of the string to any of the strings of the BDNlist. Processing continues at S1802b.

At S1807b, the string similarity calculator resets the BDNcounter and increments the BDNcounter corresponding to the newly found minimum compute-distance value, found at S1803b. Processing continues at S1802b.

Figure 19:
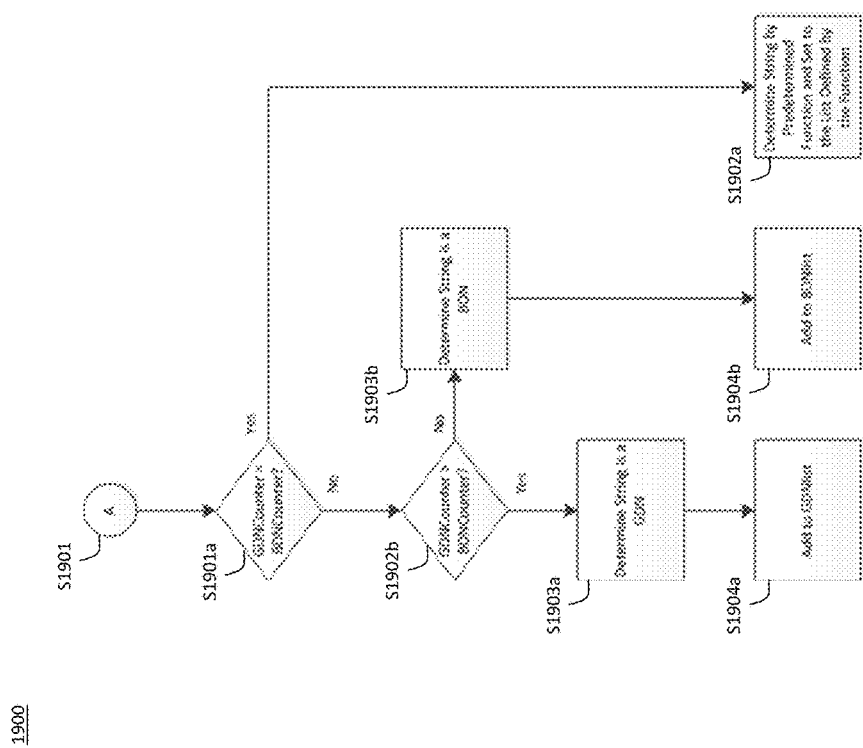
FIG. 19 is a flow diagram according to exemplary embodiments of a string-similarity calculator operation.

FIG. 19 is a flow diagram of methods according to exemplary embodiments.

The exemplary method 1900 of FIG. 19 may be applied to multiple exemplary embodiments wherein the string similarity computation calculator is utilized. In operation S1901, the string similarity calculator determines that each string of the GDNlist and BDNlist has been compared with the received string, as shown in operations S1802a and S1802b, so as to proceed to the operation 1901a.

At S1901a, the string similarity calculator determines if the GDNcounter is equal to the BDNcounter. If at S1901a, the string similarity calculator determines that the GDNcounter is equal to the BDNcounter, processing continues at S1902a. If at S1901a, the string similarity calculator determines that the GDNcounter is not equal to the BDNcounter, processing continues at S1902b.

At S1902a, the string similarity calculator determines a type of the string by a predetermined function, which may be set and updated at any time, and also adds that particular sting to a list determined by the function; however, this is merely an exemplary embodiment and other methods for classifying the string may include decision trees and machine learning classifiers such as the Random Forrest model, using CDtoGDN, CDtoBDN, GDNcounter and BDNcounter as classification features.

At S1902b, the string similarity calculator determines if the GDNcounter is greater than the BDNcounter. If at S1902b, the string similarity calculator determines that the GDNcounter is greater than the BDNcounter, processing continues at S1903a. If at S1902b, the string similarity calculator determines that the GDNcounter is not greater than the BDNcounter, processing continues at S1903a.

At S1903a, the string similarity calculator has determined, S1902b, that the GDNcounter is greater than the BDNcounter. Processing continues at S1904a.

At S1904a, the string similarity calculator adds the string to the GDNlist, however, this is merely an exemplary embodiment, and the string similarity calculator does not add the string to the GDNlist according to another exemplary embodiment. According to another exemplary embodiment, the string similarity calculator outputs the string with an indication that the string corresponds to the GDNlist.

At S1903b, the string similarity calculator has determined, at S1902, that the GDNcounter is not greater than the BDNcounter. Processing continues at S1904b.

At S1904b, the string similarity calculator adds the string to the BDNlist, however, this is merely an exemplary embodiment, and the string similarity calculator does not add the string to the BDNlist according to another exemplary embodiment. According to another exemplary embodiment, the string similarity calculator outputs the string with an indication that the string corresponds to the BDNlist.

Figure 20:
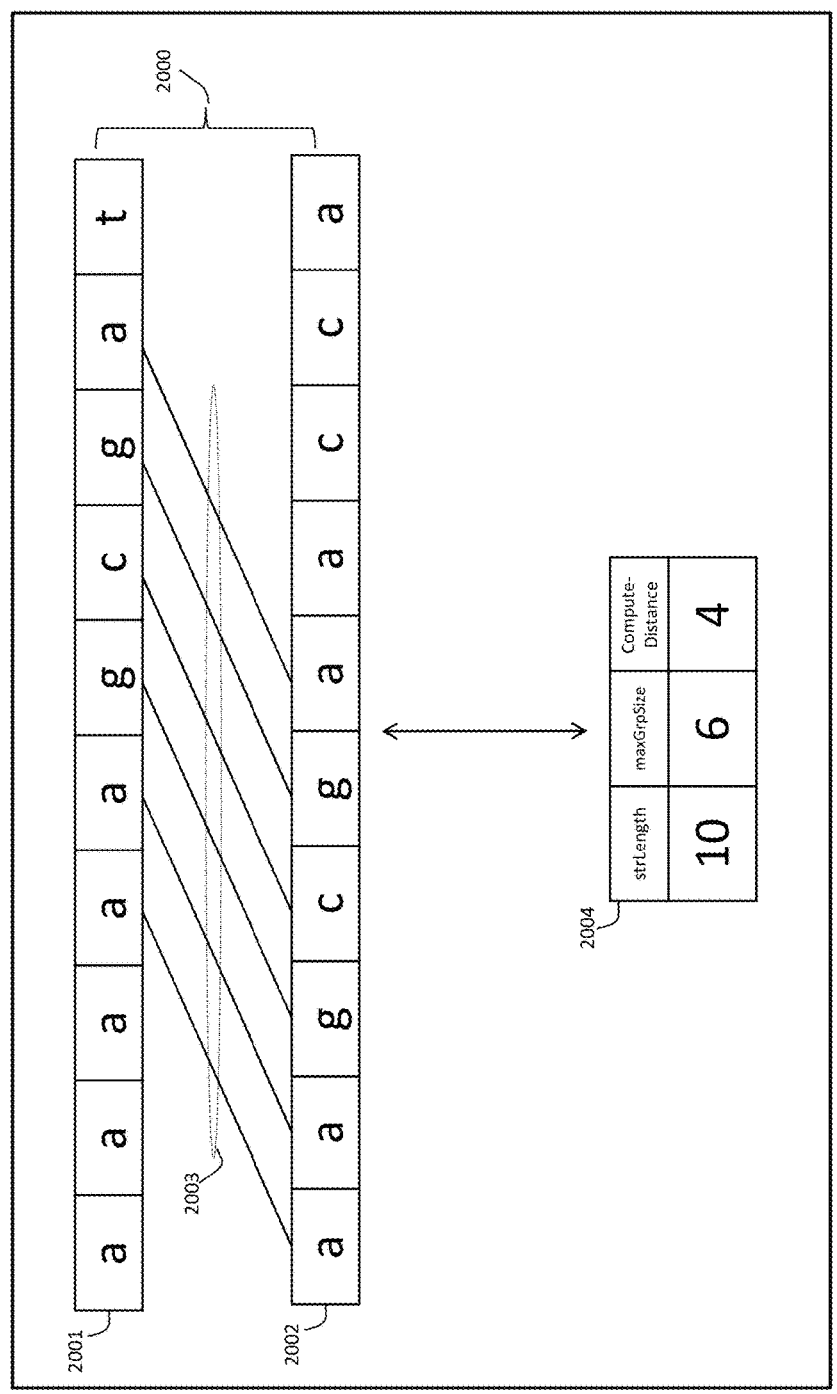
FIG. 20 is a highly simplified illustrative drawing showing a group of strings and a string similarity calculation result according to exemplary embodiments.

FIG. 20 is a highly simplified illustrative drawing showing concepts of operation according to exemplary embodiments.

FIG. 20 shows set of strings 2000, a first string 2001, a second string 2002, a group of parallel lines 2003, and a table 2004.

The first string 2001 corresponds to a nucleotide sequence "aaaagcgat". The second string 2002 corresponds to a nucleotide sequence "aagcgaacca". The table 2004 corresponds to the compute-distance, found by a string similarity calculator, corresponding to the computational cost of converting the first string 2001 into the second string 2002.

As shown by the table 2004, the strLength corresponds to the length of the longest string. In this exemplary embodiment, the first string 2001 and the second string 2002 both contain ten characters, and accordingly, the strLength, of table 2004, reflects the ten character length.

The table 2004 also shows the maxGrpSize corresponding to the maximum number of characters from the set of string 2000 whereby a group of parallel lines with matching inclines are drawn. In this exemplary embodiment, the maxGrpSize is found, by the string similarity calculator, to correspond six characters.

The table 2004 also shows the Compute-Distance corresponding to the compute-distance found by the string similarity calculator when calculating the similarity between the first string 2001 and the second string 2002. In this exemplary embodiment, the compute-distance is found, by the string similarity calculator, to have a value of four. Therefore, the computation cost, as found by the compute-distance metric, for converting the first string 2001 into the second string 2002, is found to be four.

Figure 21:
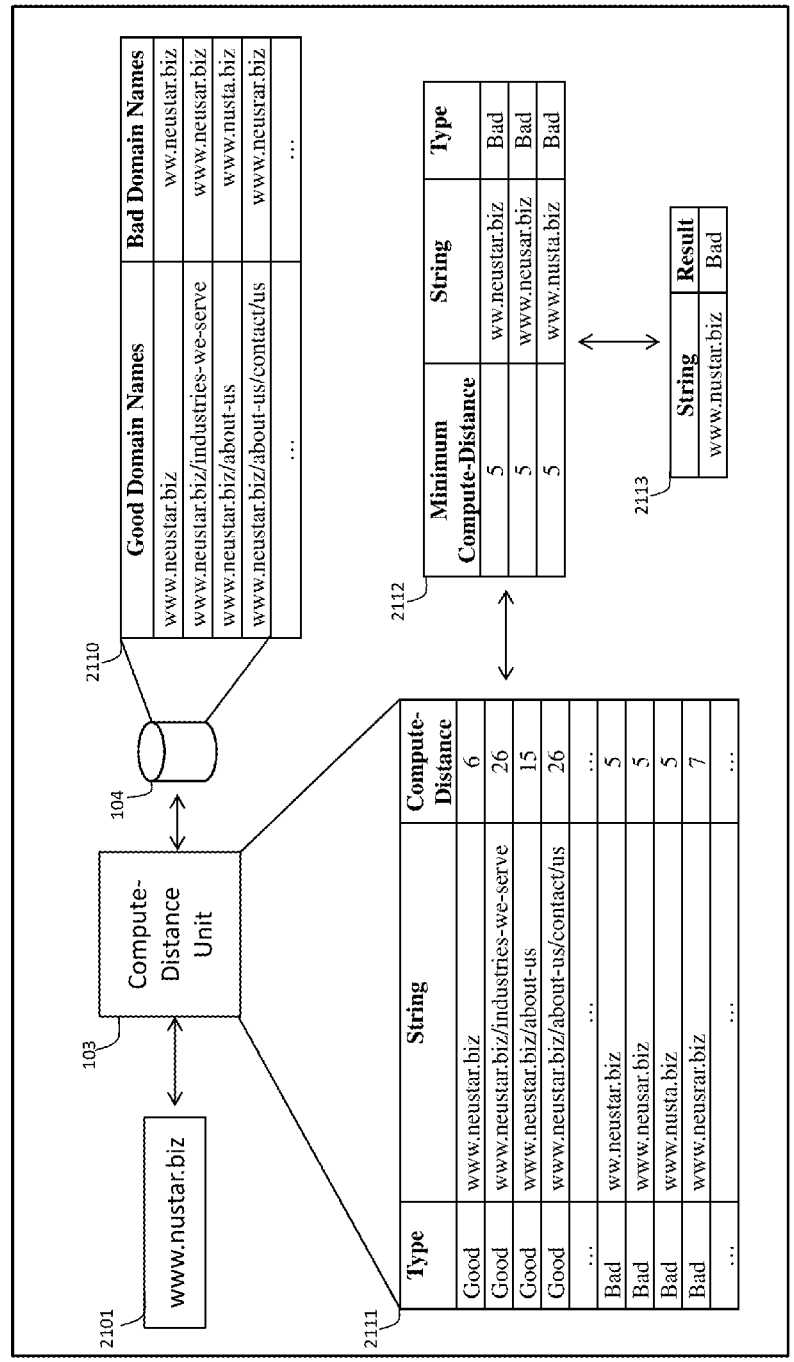
FIG. 21 is a highly simplified illustrative drawing showing a string-similarity calculator with a memory of good and bad domain names according to exemplary embodiments.

FIG. 21 is a highly simplified illustrative drawing showing concepts of operation according to exemplary embodiments.

FIG. 21 shows a string 2101, a compute-distance calculator 103, a memory 104, a good-and-bad domain name table 2110, a compute-distance table 2111, a minimum compute-distance table 2112, and a compute-distance results table 2113.

The string 2101 is a domain name which may be input by any of a user, a network manager, or a simulation device. The good-and-bad domain name table 2110 contains a list of recognized good domain names and bad domain names. The list of the good-and-bad domain name table 2110 may be partitioned or aggregated according to other exemplary embodiments.

The compute-distance table 2111 contains a list of results between a string and each of a plurality of good and bad domain names. According to an example embodiment, the compute-distance calculator 103 utilizes only good domain names, and according to another example embodiment the compute-distance calculator 103 utilizes only bad domain names. According to another example embodiment, the compute-distance calculator selectively retrieves a list from the memory 104 which may not contain the entire list of domain names.

The minimum compute-distance table 2112 contains a list of results with the minimum compute-distance, the corresponding string, and the corresponding string type. The minimum compute-distance table 2112 may be generated from the good-and-bad domain name table 2111 by the compute-distance calculator 103.

The results table 2113 contains the string 2101 and the result, whether good or bad as determined by the compute-distance calculator 103.

The compute-distance calculator 103 receive the string 2101, "www.nustar.biz", and calculates the compute-distance between the string 2101 and each of the strings contained in the good-and-bad domain name list 2110 in the memory 104. The compute-distance stores these values in the compute-distance table 2111 from which the minimum compute-distance table 2112 and results table 2113 may be generated.

According the exemplary embodiment of FIG. 21, the compute-distance calculator 103 determined that the string 2101, "www.nustar.biz", is a bad domain name. According to an exemplary embodiment, the compute-distance calculator 103 may add the string 2101 to the memory 104 in either the good or bad domain name lists. According to another example embodiment, the compute-distance calculator 103 may add the string 2101 to a new table of received strings, not shown.

The exemplary embodiment of FIG. 21 illustrates domain names, however the string 2101 and the memory 104 may be populated with any type of strings such as nucleotide sequences, device names, or device locations.

Figure 22:
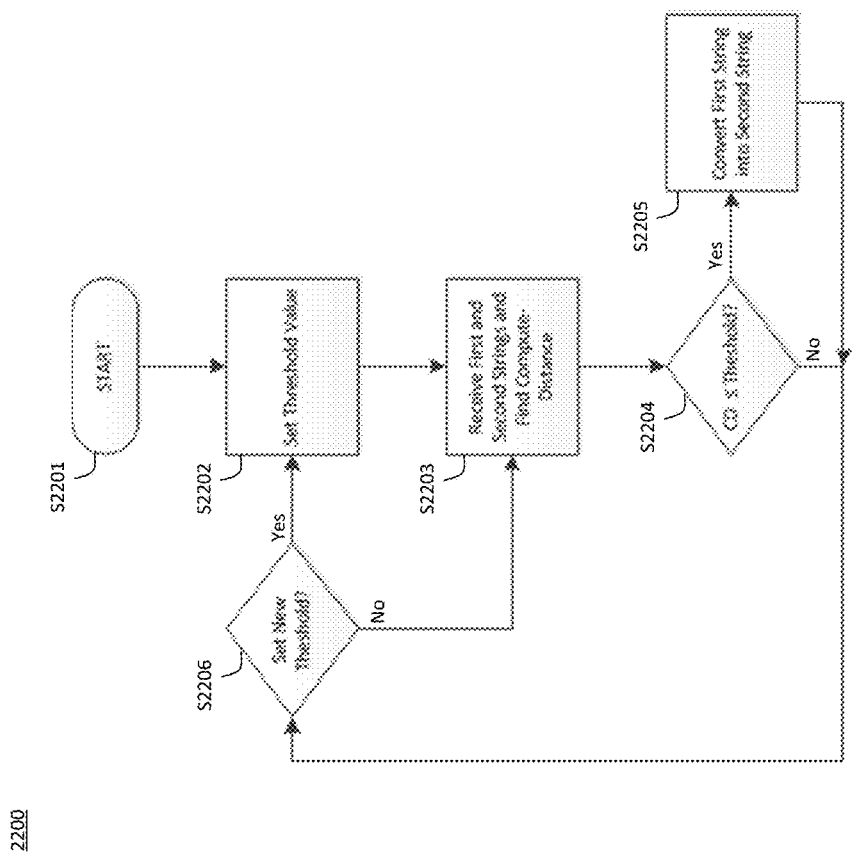
FIG. 22 is a flow diagram of a string simulation calculator conversion according to exemplary embodiments.

FIG. 22 is a flow diagram of methods according to exemplary embodiments.

The exemplary method 2200 of FIG. 22 may be applied to multiple exemplary embodiments wherein the string similarity computation calculator is utilized. At S2201 the string similarity calculator is ready to begin computation and may initialize its values. Processing continues at S2202.

At S2202, the string similarity computation calculator sets a threshold value, by which the similarity value may be later compared. This threshold value may be user input or predetermined by the string similarity computation calculator. Processing continues at S2203.

At S2203, the string similarity computation calculator receives a first string and a second string and also finds the compute-distance value between the first string and the second string. Processing continues at S2204.

At S2204, the string similarity computation calculator compares the compute-distance value (CD) from S2203 with the threshold value from S2202. If the string similarity computation calculator determines that the compute-distance value is less than or equal to the threshold value then the processing continues at S2205. If the string similarity computation calculator determines that the compute-distance value is greater than the threshold value, then the processing continues at S2206.

At S2205, the string similarity computation calculator determined that the compute-distance value is less than or equal to the threshold value and converts the first string into the second string. Processing continues at S2206.

At S2206, the string similarity calculator determines if there is to be a new threshold value. This may be determined by user input at the time of processing or by predefined settings determined by the string similarity calculator. If the string similarity calculator determines that a new threshold value is to be set, the string similarity calculator sets the new threshold and processing continues at S2202. If the string similarity calculator determines that a new threshold value is not to be set, processing continues at S2203.

Figure 23:
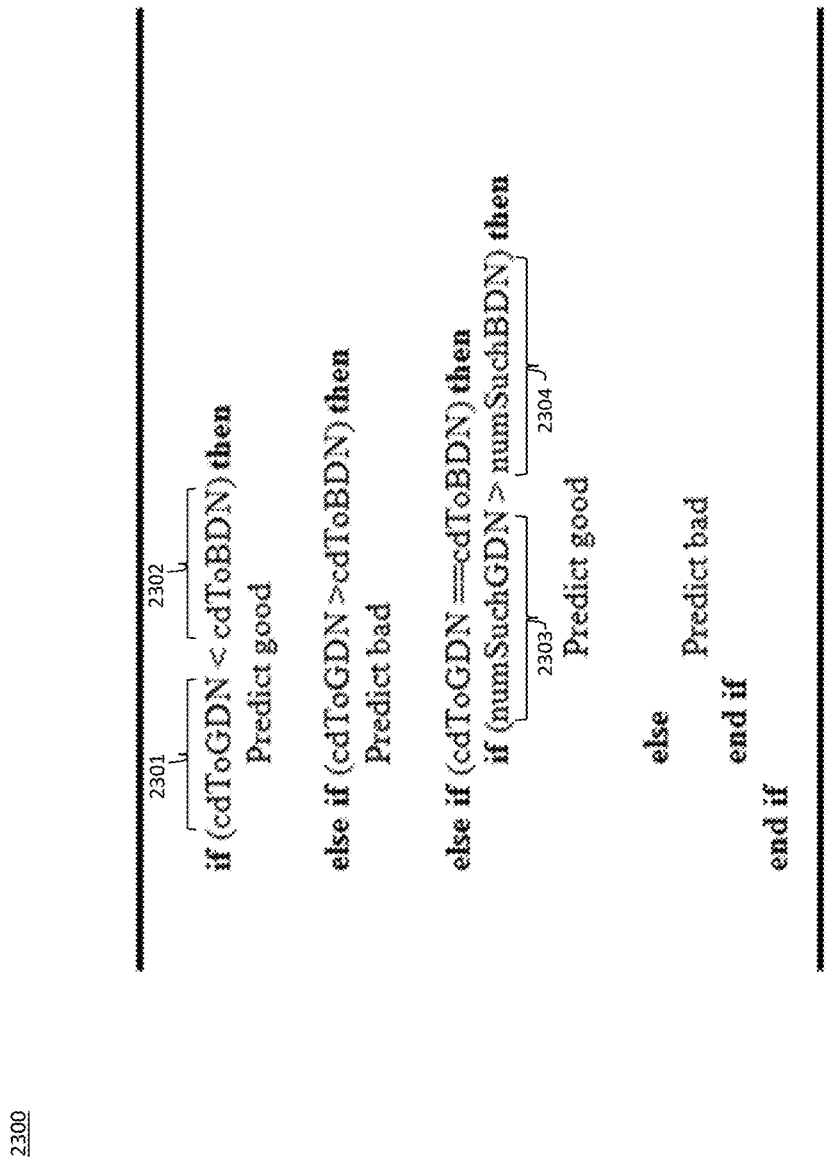
FIG. 23 is a highly simplified pseudocode illustrating concepts of operation according to exemplary embodiments.

FIG. 23 illustrates pseudocode 2300 used to predict whether a string should be placed in a list of good strings or a list of bad strings, where these strings may be any of domains, nucleotide sequences, device names, and the like.

According to exemplary embodiments, the following elements are defined in FIG. 23. cdToGDN 2301 is a distance from a string to a "good" list of "good" or non-malicious strings; cdToBDN 2302 is a distance from the string to a "bad" list of "bad" or malicious strings, numSuchGDN 2303 is a number of strings of the good list which satisfy a minimum compute distance among good list, and numSuchBDN 2304 is a number of strings of the bad list which satisfy a minimum compute distance value among the bad list. The distance from a string to either list, good or bad, is the compute-distance from the string to a string of the respective list that results in the minimum compute-distance value.

In FIG. 23, the pseudocode 2300 determines if the cdToGDN 2301 is less than the cdToBDN. This is provided by way of an example only and not by way of a limitation. When the cdToGDN 2301 is less than the cdToBDN 2302, the prediction is good, and the string is considered not to be a malicious string. That is, in an exemplary embodiment, this would indicate that the string is an existing domain name i.e., a working URL. When the cdToGDN 2301 is greater than the cdToBDN 2302, the prediction is bad, and the string is considered likely to be a malicious or otherwise undesired string. That is, in an exemplary embodiment, this may indicate that the string is a typo or an error in the domain name, i.e., a non-working URL. When the cdToGDN 2301 is equal to the cdToBDN 2302, the prediction is determined based on a predetermined function which may be modified at any time. That is, in an exemplary embodiment, additional calculations and checks need to be performed to determine whether the string is a bad string or a good string.

According to an exemplary embodiment of FIG. 23, when numSuchGDN 2303 is greater than numSuchBDN 2304, the prediction is good and the string is considered likely to be not a malicious string, as in an example provided above. When the numSuchGDN 2303 is not greater than numSuchBDN 2304, the prediction is bad, and the string is considered likely to be a malicious or otherwise undesired string. Additionally, when a string is determined to be of or for one list, the string may be added to the list, and a string may, in response, be removed from the list. The numSuchGDN 2303 or numSuchBDN 2304 may be updated or otherwise modified by any of the addition and deletion.

In an exemplary embodiment, such as the one depicted in FIG. 1, the compute-distance calculator 103 may be implemented on a computer-readable medium. The term "computer-readable medium" as used herein refers to any medium that participates in providing instructions to a processor for execution. A computer readable medium may be, for example, but not limited to, an electronic, magnetic, optical, electromagnetic, infrared, or semiconductor system, apparatus, or calculator, or any suitable combination of the foregoing. More specific examples (a non-exhaustive list) of the computer readable medium would include the following: an electrical connection having two or more wires, a portable computer diskette such as a floppy disk or a flexible disk, magnetic tape or any other magnetic medium, a hard disk, a random access memory (RAM), a read-only memory (ROM), an erasable programmable read-only memory (EPROM or Flash memory), a memory card, any other memory chip or cartridge, an optical fiber, a portable compact disc read-only memory (CD-ROM), any other optical medium, punchcards, papertape, any other physical medium with patterns of holes, or any other medium from which a computer can read or suitable combination of the foregoing.

In the context of this document, a computer readable medium may be any tangible, non-transitory medium that can contain, or store a program for use by or in connection with an instruction execution system, apparatus, or calculator.

Another form is signal medium and may include a propagated data signal with computer readable program code embodied therein, for example, in a base band or as part of a carrier wave. Such a propagated signal may take any of a variety of forms, including, but not limited to, the electro-magnetic, optical, or any suitable combination thereof. The signal medium may include coaxial cables, copper wire and fiber optics, including the wires that comprise data bus. The signal medium may be any medium that is not a computer readable storage medium and that can communicate, propagate, or transport a program for use by or in connection with an instruction execution system, apparatus, or calculator.

Program code embodied on a computer readable medium may be transmitted using any appropriate medium, including but not limited to wireless, wire line, optical fiber cable, RF, etc. or any suitable combination of the foregoing.

Computer program code for carrying out operations for aspects of the exemplary embodiments may be written in any combination of one or more programming languages, including an object oriented programming language such as Java, Smalltalk, C++, .Net or the like and conventional procedural programming languages. The program code may execute entirely on the user's computer, partly on the user's computer, as a stand-alone software package, partly on the user's computer and partly on a remote computer or entirely on the remote computer or server. The remote computer may be connected to the user's computer through any type of network, including a local area network (LAN) or a wide area network (WAN), or the connection may be made to an external computer (for example, through the Internet using an Internet Service Provider).

The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks. Volatile media includes dynamic memory.

Various forms of computer readable media may be involved in carrying one or more sequences of one or more instructions to a processor such as a CPU for execution. For example, the instructions may initially be carried on a magnetic disk from a remote computer. Alternatively, a remote computer can load the instructions into its dynamic memory and send the instructions over a telephone line using a modem. A modem local to a computer system can receive the data on the telephone line and use an infra-red transmitter to convert the data to an infra-red signal. An infra-red detector can receive the data carried in the infra-red signal and appropriate circuitry can place the data on the data bus. The bus carries the data to the volatile storage, from which processor retrieves and executes the instructions. The instructions received by the volatile memory may optionally be stored on persistent storage calculator either before or after execution by a processor. The instructions may also be downloaded into the computer platform via Internet using a variety of network data communication protocols well known in the art.

The flowchart and block diagrams in the Figures illustrate the architecture, functionality, and operation of possible implementations of systems, methods and computer program products according to various exemplary embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or two blocks may sometimes be executed in the reverse order, depending upon the functionality involved. It will also be noted that each block of the block diagram and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology as used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or acts for performing the function in combination with other claimed elements as specifically claimed.

The description of the exemplary embodiments has been presented for purposes of illustration and description, but is not intended to be exhaustive or limiting in any form. Many modifications and variations will be apparent to those of ordinary skill in the art without departing from the scope and spirit of the invention. Embodiments were chosen and described in order to explain operations and the practical applications thereof, and to enable others of ordinary skill in the art to understand various embodiments with various modifications as are suited to the particular use contemplated. That is, various modifications to these embodiments will be readily apparent to those skilled in the art, and the generic principles and specific examples defined herein may be applied to other embodiments without the use of inventive faculty. For example, some or all of the features of the different embodiments discussed above may be combined into a single embodiment. Conversely, some of the features of a single embodiment discussed above may be deleted from the embodiment. Therefore, the present invention is not intended to be limited to the embodiments described herein but is to be accorded the widest scope as defined by the limitations of the claims and equivalents thereof.

What is claimed is:

1. A string similarity apparatus arranged to detect a malicious domain name, the string similarity apparatus comprising:
    a memory configured to store a plurality of instructions; and
    a processor configured to execute the plurality of instructions to perform operations including:
        receiving a uniform resource locator (URL) having a domain name character string;
        comparing, using the processor, the received domain name character string to a first dataset of non-malicious domain names and a second dataset of malicious domain names, the first and second datasets having respective first dataset and second dataset domain name character strings;
        deriving, using the processor, compute-distance string similarity values for the received domain name character string relative to the first dataset and the second dataset, the compute-distance string similarity values based on a computational cost of a distance, from each of the first dataset and the second dataset domain name character strings, of the received domain name character string due to an insertion of a character into or a deletion of a character from the middle of the received domain name character string, including the cost of shifting characters of the received domain name character string as a result of the insertion or deletion; and
        detecting, using the processor, the received domain name character string as one of malicious and non-malicious based on the compute-distance string similarity values.

2. The string similarity apparatus of claim 1, wherein detecting the received domain name character string as malicious is based on a minimum of the compute-distance string similarity values to the second dataset domain name character strings.

3. The string similarity apparatus of claim 2, the plurality of instructions further comprising adding the received domain name character string to a database of malicious domain names, the database including the second dataset.

4. The string similarity apparatus of claim 1, wherein detecting the received domain name character string as non-malicious is based on a minimum of the compute-distance string similarity values to the first dataset domain name character strings.

5. The string similarity apparatus of claim 4, the plurality of instructions further comprising adding the received domain name character string to a database of non-malicious domain names, the database including the first dataset.

6. The string similarity apparatus of claim 1, wherein the first and second datasets are stored in the memory.

7. The string similarity apparatus of claim 1, the plurality of instructions further comprising transmitting the received domain name character string detected as the one of malicious and non-malicious via a network to a user apparatus.

8. A method of detecting a malicious domain name, the method comprising:
    receiving a uniform resource locator (URL) having a domain name character string;
    comparing the received domain name character string to a first dataset of non-malicious domain names and a second dataset of malicious domain names, the first and second datasets having respective first dataset and second dataset domain name character strings;
    deriving compute-distance string similarity values for the received domain name character string relative to the first dataset and the second dataset, the compute-distance string similarity values based on a computational cost of a distance, from each of the first dataset and the second dataset domain name character strings, of the received domain name character string due to an insertion of a character into or a deletion of a character from the middle of the received domain name character string, including the cost of shifting characters of the received domain name character string as a result of the insertion or deletion; and
    detecting the received domain name character string as one of malicious and non-malicious based on the compute-distance string similarity values.

9. The method of claim 8, wherein detecting the received domain name character string as malicious is based on a minimum of the compute-distance string similarity values to the second dataset domain name character strings.

10. The method of claim 9, further comprising adding the received domain name character string to a database of malicious domain names, the database including the second dataset.

11. The method of claim 8, wherein detecting the received domain name character string as non-malicious is based on a minimum of the compute-distance string similarity values to the first dataset domain name character strings.

12. The method of claim 11, further comprising adding the received domain name character string to a database of non-malicious domain names, the database including the first dataset.

13. The method of claim 8, further comprising transmitting the received domain name character string detected as the one of malicious and non-malicious via a network to a user apparatus.

14. A non-transitory computer-readable medium that stores instructions, executable by one or more processors, to cause the one or more processors to perform operations that comprise:

receiving a uniform resource locator (URL) having a domain name character string;

comparing the received domain name character string to a first dataset of non-malicious domain names and a second dataset of malicious domain names, the first and second datasets having respective first dataset and second dataset domain name character strings;

deriving compute-distance string similarity values for the received domain name character string relative to the first dataset and the second dataset, the compute-distance string similarity values based on a computational cost of a distance, from each of the first dataset and the second dataset domain name character strings, of the received domain name character string due to an insertion of a character into or a deletion of a character from the middle of the received domain name character string, including the cost of shifting characters of the received domain name character string as a result of the insertion or deletion; and detecting the received domain name character string as one of malicious and non-malicious based on the compute-distance string similarity values.

\* \* \* \* \*